INVENTOR.
W.L. LIVINGSTON
BY
HIS ATTORNEY

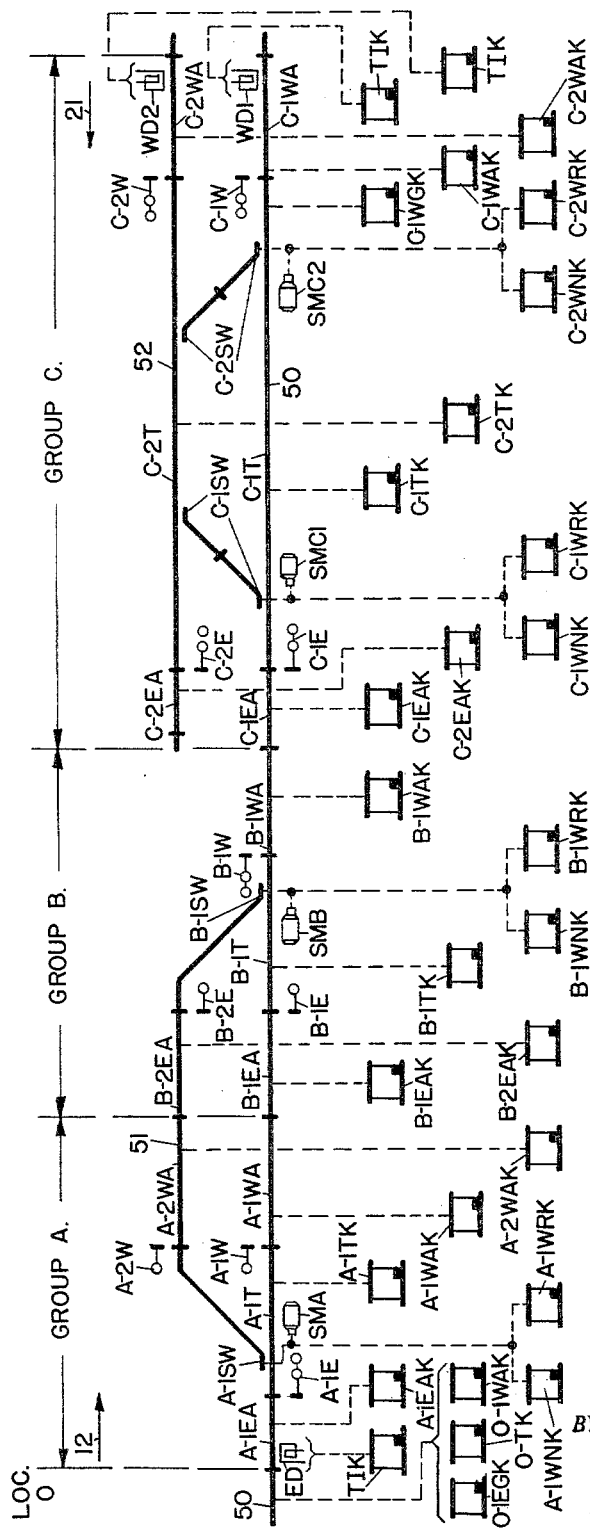
FIG. 2. TRACK LAYOUT
INVENTOR.
W. L. LIVINGSTON

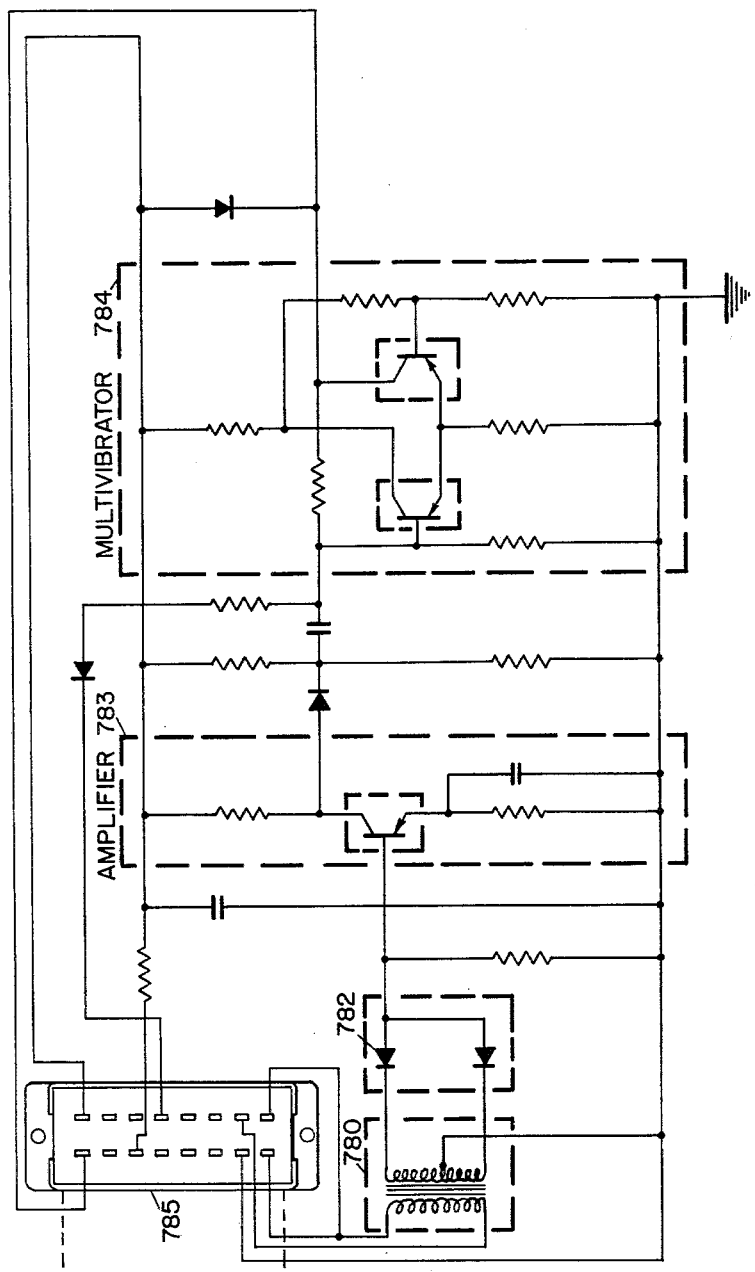

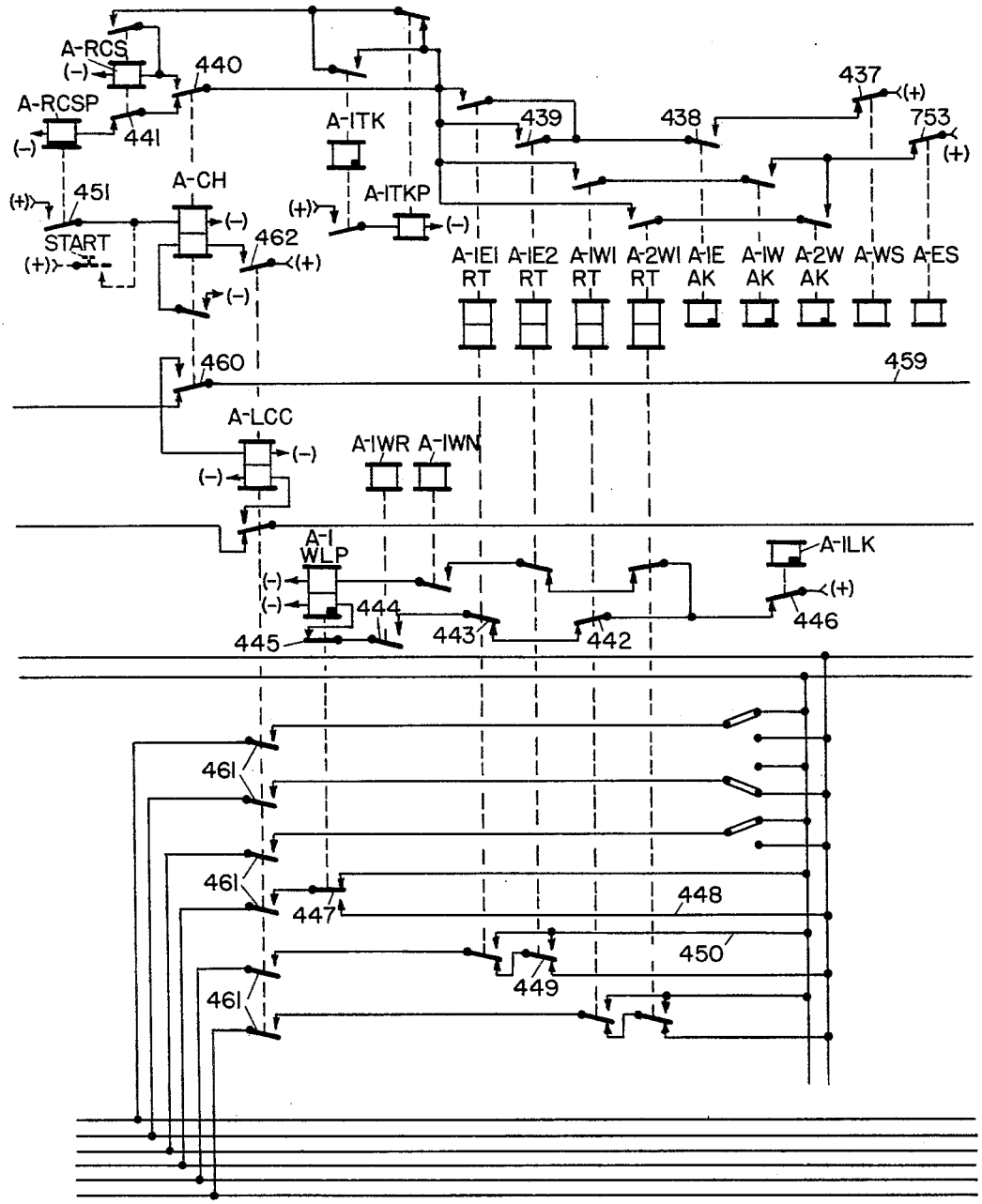

Nov. 23, 1965 W. L. LIVINGSTON 3,219,814
CENTRALIZED TRAFFIC CONTROL SYSTEM
Filed Nov. 3, 1960 19 Sheets-Sheet 5

INVENTOR.
W.L. LIVINGSTON
BY
HIS ATTORNEY

Nov. 23, 1965    W. L. LIVINGSTON    3,219,814
CENTRALIZED TRAFFIC CONTROL SYSTEM
Filed Nov. 3, 1960    19 Sheets-Sheet 6

INVENTOR.
W.L. LIVINGSTON
BY
HIS ATTORNEY

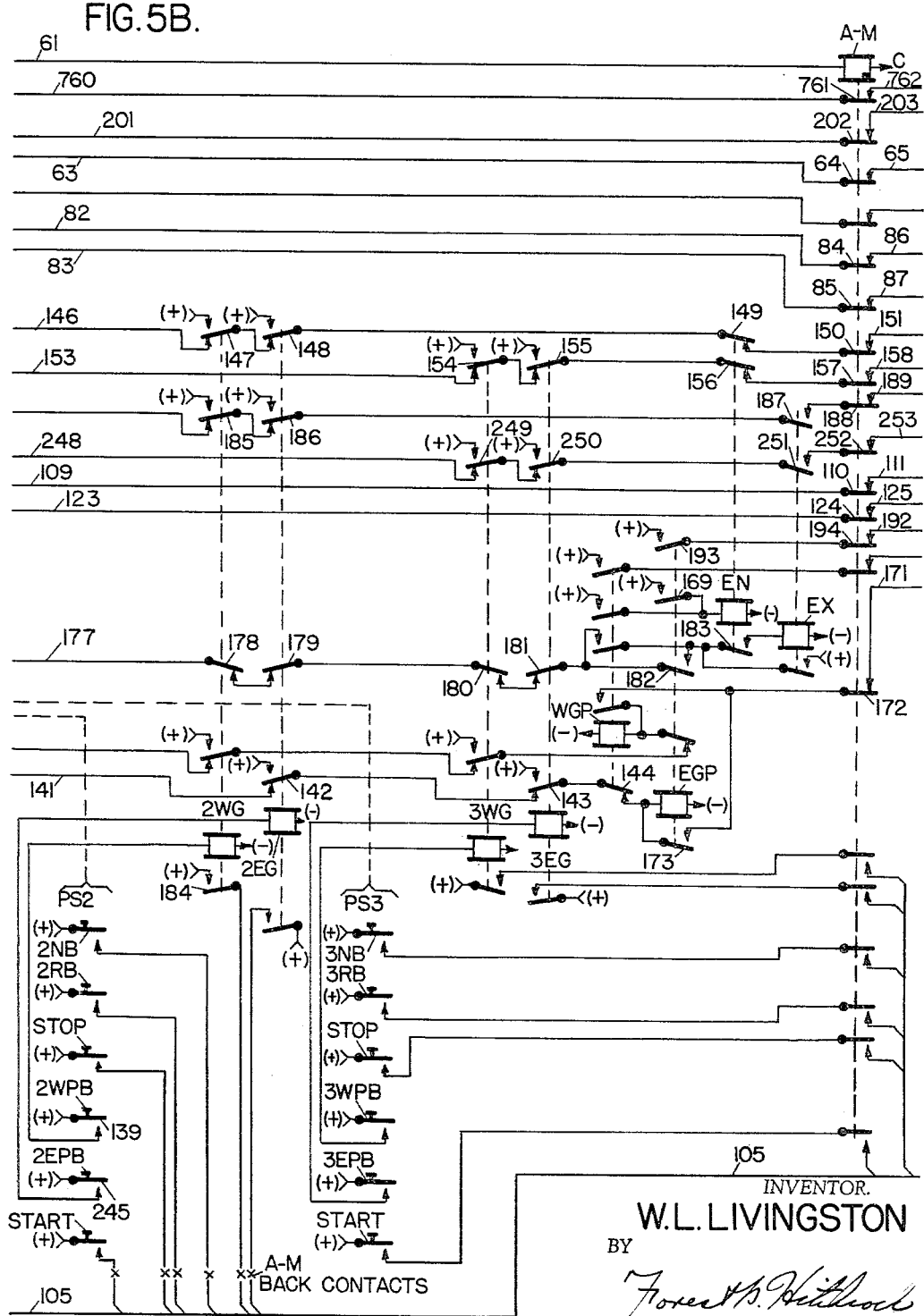

Nov. 23, 1965 W. L. LIVINGSTON 3,219,814
CENTRALIZED TRAFFIC CONTROL SYSTEM
Filed Nov. 3, 1960 19 Sheets-Sheet 8

INVENTOR.
W.L. LIVINGSTON
BY
Forest B. Hitchcock
HIS ATTORNEY

Nov. 23, 1965 W. L. LIVINGSTON 3,219,814
CENTRALIZED TRAFFIC CONTROL SYSTEM
Filed Nov. 3, 1960 19 Sheets-Sheet 9

INVENTOR.
W.L. LIVINGSTON
BY
Forest B. Hitchcock
HIS ATTORNEY

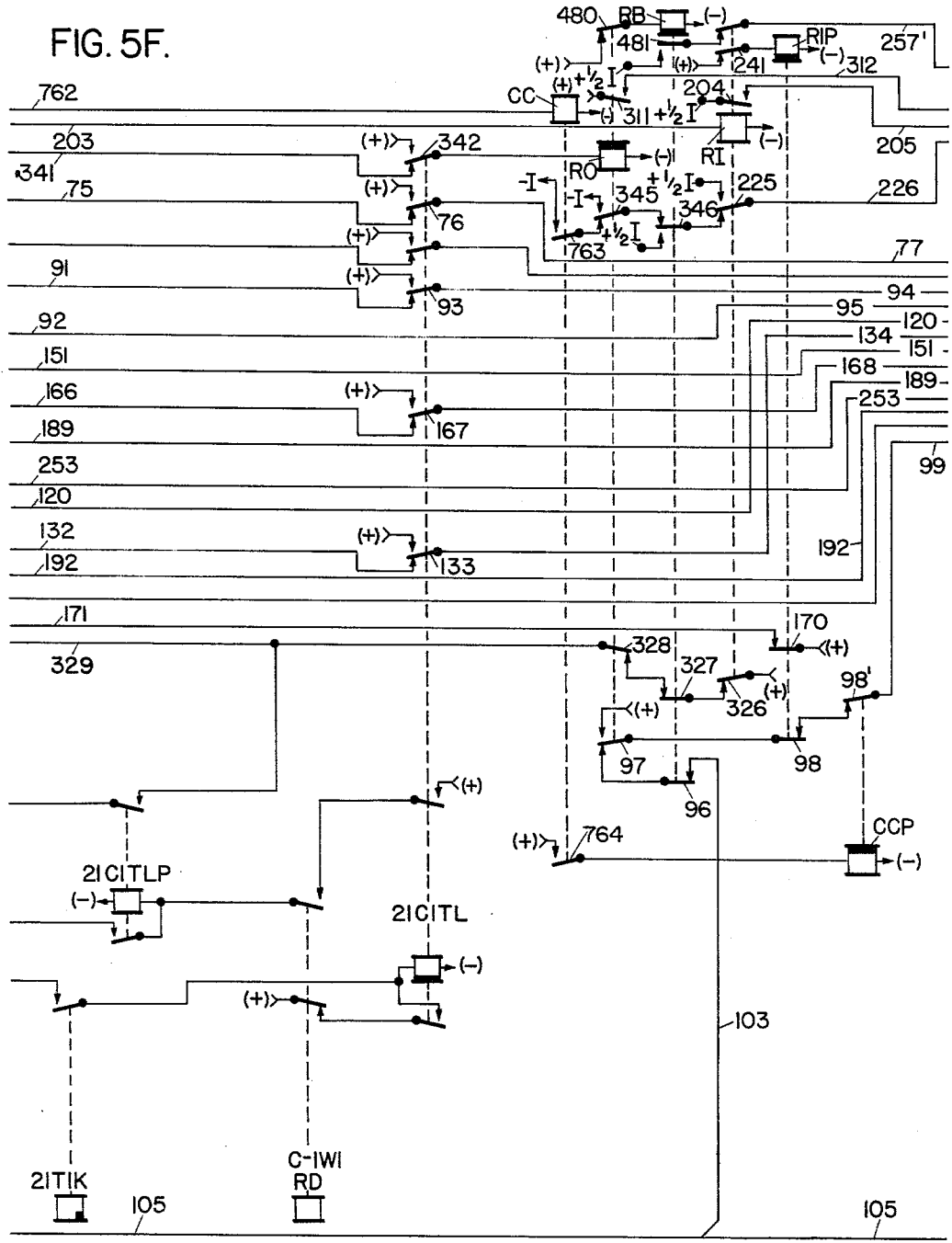

Nov. 23, 1965  W. L. LIVINGSTON  3,219,814
CENTRALIZED TRAFFIC CONTROL SYSTEM
Filed Nov. 3, 1960   19 Sheets-Sheet 12

INVENTOR.
W.L. LIVINGSTON
BY
Forest N. Hitchcock
HIS ATTORNEY

Nov. 23, 1965    W. L. LIVINGSTON    3,219,814
CENTRALIZED TRAFFIC CONTROL SYSTEM
Filed Nov. 3, 1960    19 Sheets-Sheet 13

INVENTOR.
W.L. LIVINGSTON
BY
Forest B. Hitchcock
HIS ATTORNEY

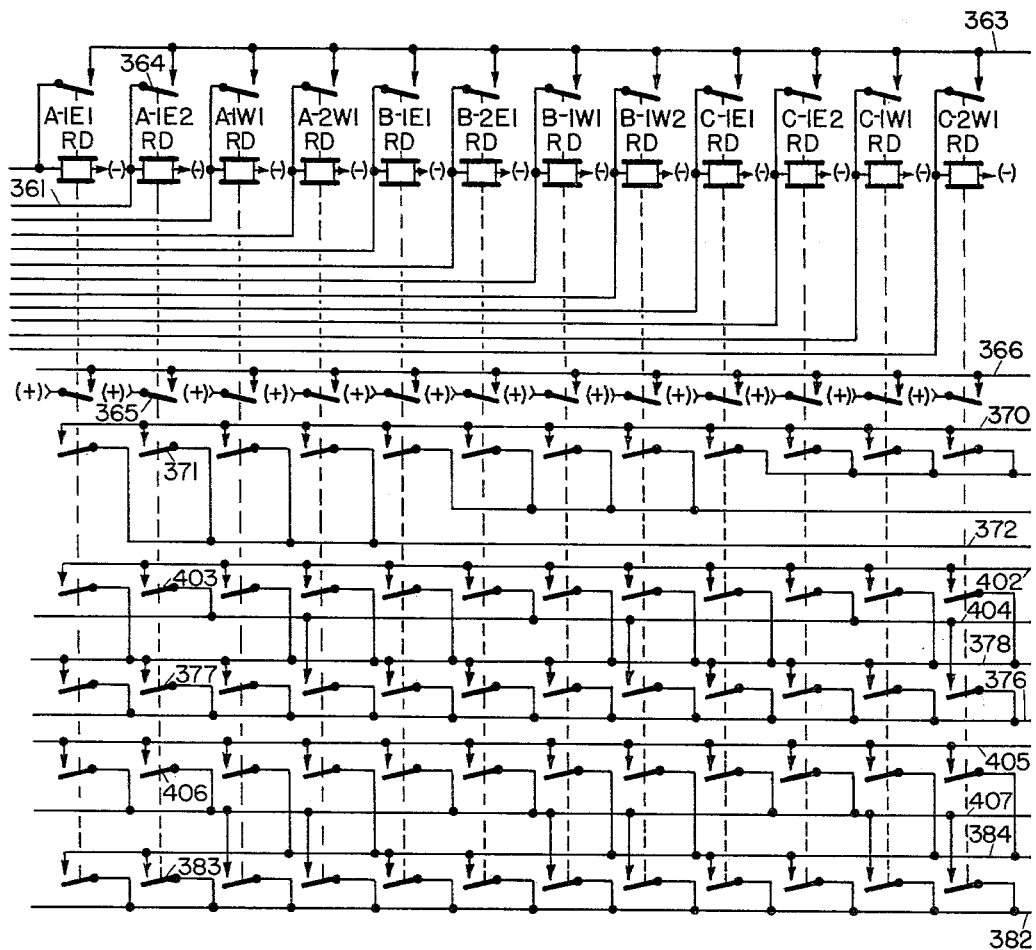

Nov. 23, 1965  W. L. LIVINGSTON  3,219,814
CENTRALIZED TRAFFIC CONTROL SYSTEM
Filed Nov. 3, 1960  19 Sheets-Sheet 15

INVENTOR.
W. L. LIVINGSTON
BY
Forest B. Hitchcock
HIS ATTORNEY

Nov. 23, 1965  W. L. LIVINGSTON  3,219,814
CENTRALIZED TRAFFIC CONTROL SYSTEM
Filed Nov. 3, 1960  19 Sheets-Sheet 16

INVENTOR.
W. L. LIVINGSTON
BY
HIS ATTORNEY

Nov. 23, 1965

W. L. LIVINGSTON 3,219,814

CENTRALIZED TRAFFIC CONTROL SYSTEM

Filed Nov. 3, 1960

INVENTOR.
W.L. LIVINGSTON
BY
Forest B. Hitchcock
HIS ATTORNEY

Nov. 23, 1965  W. L. LIVINGSTON  3,219,814
CENTRALIZED TRAFFIC CONTROL SYSTEM
Filed Nov. 3, 1960  19 Sheets-Sheet 19

INVENTOR.
W. L. LIVINGSTON
BY
Forest N. Hitchcock
HIS ATTORNEY

United States Patent Office

3,219,814
Patented Nov. 23, 1965

3,219,814
CENTRALIZED TRAFFIC CONTROL SYSTEM
Waltrus L. Livingston, Rochester, N.Y., assignor to
General Signal Corporation
Filed Nov. 3, 1960, Ser. No. 73,933
11 Claims. (Cl. 246—3)

The present invention relates to a track switch and signal control system, and more particularly to an improved centralized traffic control system wherein supervisory control of railway traffic through an extensive track layout is accomplished by the remote control of track switches and signals from a central control office.

In present centralized traffic control systems of this general character, a track diagram corresponding to the track layout is located in the central control office, and the positions of the switches, aspects of the signals, and the occupancy of the track is displayed on or adjacent to this diagram. Associated with each switch and signal is a manual lever or buttom for controlling the aspect to be displayed by the various signals, and controlling the positions of the various switches. After the operator has received word, by telephone or other means of communication, of the approach of one or more trains into the territory under his direction, and information concerning the destination of these approaching trains, he operates the levers or buttons to control the switches and signals as the trains travel through the territory for routing the trains to their proper destination. In installations where the traffic is unusually heavy, and the territory is extensive involving numerous tracks, sidings, switches and cross-overs spaced over many miles of track, the control of the traffic in an efficient manner becomes extremely difficult. This difficulty is further increased at times when delays occur, additional trains are added, or the time table for one or more trains changes. In these instances the operator must not only efficiently route the normally scheduled traffic, but he must also cope with the changes as well, keeping in mind possible conflicting routes with the scheduled trains.

The purpose of the present invention is to provide an improved centralized traffic control system which is automatic in setting up routes or portions of routes for regularly scheduled train movements, and also provides manual control for unscheduled train movement, and manual override control of scheduled movements in case of emergency.

In furtherance of the above, one of the objects of the present invention is to provide an improved centralized traffic control system wherein the routes for each individual train that is to travel throughout the entire territory controlled by the system may be stored in the system indefinitely.

Another object of this invention is to provide an improved centralized traffic control system wherein portions of routes may be stored indefinitely in the system for each individual train that is to travel through controlled territory.

Another object of this invention is to provide an improved centralized traffic control system wherein a stored route is effective to be read out of the system upon the approach of a train and the same route read back into the system.

Another object of the invention is to provide an improved centralized traffic control system wherein the approach of a train for which a route has been stored in the system causes successive portions of the route to be set up automatically as the train progresses through the territory.

Another object of this invention is to provide an improved centralized traffic control system which is capable of routing the traffic efficiently automatically regardless of any delays or changes of scheduled times.

Still another object of the invention is to provide an improved centralized traffic control system of the character described wherein the approaching train is identified by the system only at the entrance to the controlled territory for causing a plurality of successive stored routes to be set up for the identified train.

Another object of this invention is to provide an improved centralized traffic control system of the character described wherein a manual route may be set up for an approaching train and held in the system until the train reaches the approach to the route.

A further object of this inevntion is to provide an improved centralized traffic control system of the character described wherein any portion of a route that is stored in the system may be cancelled or changed at any time prior to the arrival of the train without disturbing the other routes that are stored indefinitely in the system.

A further object of this invention is to provide an improved centralized traffic control system of the character described wherein the meeting of two trains traveling in opposite directions in the territory is accomplished automatically, efficiently and safely.

A further object of the invention is to provide an improved centralized traffic control system which is safe, efficient, and reliable, and will be able to handle practically any traffic situation in an adequate manner.

Other objects of this invention will become apparent from the specification, the drawings, and the appended claims. In the drawings:

FIG. 2 is a track diagram illustrating diagrammatically the various track sections switches and signals and the indication relays associated therewith in accordance with this embodiment of the invention;

FIG. 3 is a schematic diagram of a transistor digital read-out unit used in this invention;

FIGS. 4A and 4B are fragmentary schematic illustrations of various apparatus and control office circuitry for operating the code communication apparatus.

The illustrations employed in the disclosure of the present invention have been arranged to facilitate the disclosure of the invention as to its mode of operation and the principles involved rather than for the purpose of illustrating the construction and arrangement of parts that would be employed in practice. The relays and their contacts are shown in a conventional manner and schematic diagrams are used. The symbols (+) and (−) have been used to identify respective positive and negative terminals of suitable batteries or other sources of direct current, and the symbols +½I have been used to designate the connection to a source of current of predetermined value. The symbols −I have been used to indicate a connection to a negative source of direct current of another predetermined value.

For the purpose of simplifying the disclosure of the present invention, the present invention is shown as being applied to a portion of a relatively simple track layout that may be considered as being a typical part of an extensive track layout or that may be considered as just illustrating typical circuits which may be applied by a person skilled in the art to the control of track switches and signals in different and more complex arrangements of switches and signals in more extensive track layouts.

Figure 1:
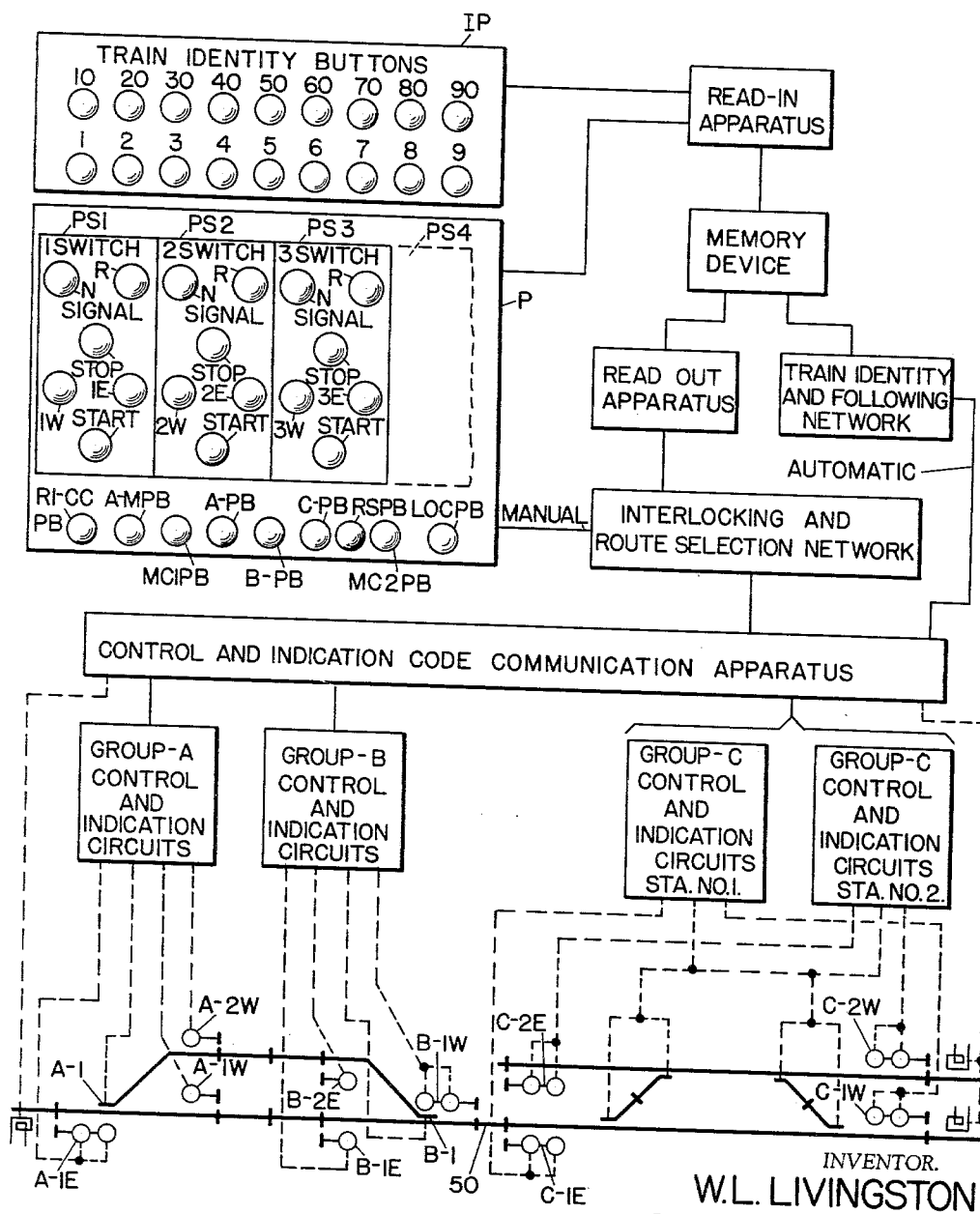
FIG. 1 is a block diagram illustrating the general arrangement of the system according to one embodiment of this invention.
Figure 5A:
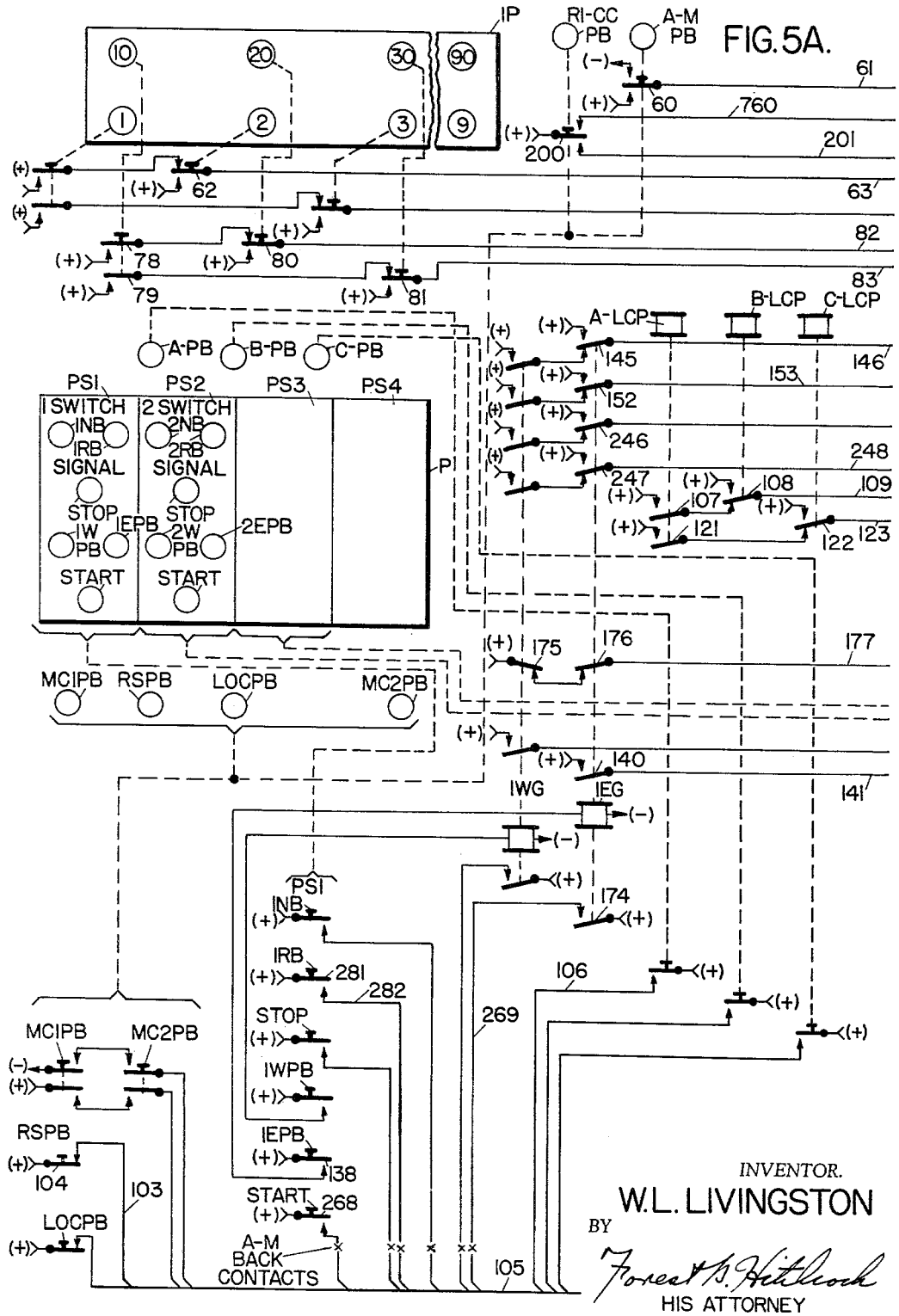
FIGS. 5A through 5P (FIGS. 5I and 5O being omitted) when placed side by side illustrate schematically the circuitry according to this embodiment of the invention.

It is to be understood that the system includes a suitable centralized traffic control machine (not shown), such as is well-known in the art for use at the control office in controlling traffice and the storage of routes through the track layout for which this system is provided. This machine has a suitable control panel, a portion of which is illustrated in FIGS. 1 and 5A which has a track diagram (not shown) associated therewith with suitable indicator lamps being disposed along the trackway of the diagram for keeping an operator informed of the positions of the trains and of the conditions of the track switches and signals. Inasmuch as the present application is more particularly concerned with the control office apparatus for storing and selecting sending out the communication of controls for the switches and signals, for the purpose of simplification of the present disclosure, the actual code communication apparatus for sending out these controls and receiving the indications of the positions of the trains, the aspects of the signals, and the positions of the switches, is shown either in block form or fragmentarily. Indication communication apparatus such as is disclosed in the prior U.S. application of H. C. Sibley, Ser. No. 485,973, filed February 3, 1955, which has resulted in Patent No. 2,955,278, granted October 4, 1960, or code communication apparatus as disclosed in the U.S. patent of Coley, No. 2,953,772, may be used with the system of the present invention and reference is made thereto for a more detailed description thereof.

According to the present invention equipment is provided in the central control office which includes a track diagram of the territory controlled by the system, and a control machine having various push buttons for operating the system. The control machine or console also includes push buttons for setting up train identification memory codes by train number.

Also included in the control office equipment is a memory matrix of the ferrite core type having associated read-in circuit banks and fans arranged to permit a train dispatcher to set up memory codes containing such information as train number, the group location and the route to be taken by respective trains through such a group location. The reading in circuitry in this embodiment of the invention is arranged on the sequence principle of operation wherein the route that is stored is dependent upon the sequence of operation of the buttons associated with the signals. The button associated with a particular signal that is operated first designates that particular system as the entrance point of a route and the next button that is operated designates the associated signal as the exit point of a route.

Circuit banks and fans are also included for reading out the memory code together with readback circuits for reinserting the memory code into the matrix. The readout bank includes a fan network which controls a route determining bank of relays, which in turn controls a route control selection bank. The route control selection bank operates on a two cycle principle wherein the route determining bank calls the route entrance point first in a relay sequence operation, then through a transfer circuit calls the route exit point after which it clears out. When the network has been completely set up, it is transferred to the route selection and storage relays and the network is restored to normal.

The field location equipment includes a conventional train identification system similar to the type that uses a fixed frequency inductor carried by each train, but providing a different frequency for each train, and also a wayside receiver located at the entrance to the controlled territory. Train identity following networks are so arranged to be triggered and to identify a train when it enters the control territory. This network follows the train according to its movement from each location in the territory to its next location.

In operating the system manually the routes, when set up are held in the system until a train is on the approach to the route. In the control office, the switch control relays are controlled by the route selection and storage relays and associated circuitry, and these switch control relays remain energized as long as the train occupies the route. If the train is not yet on the approach, the route is held in the system and the associated switch control relays are released for use in other routes. However, when the train arrives on the approach, the proper switch control relay is picked up as soon as they are available and then transmits the control.

Apparatus and circuitry in the control office equipment is provided and also so arranged that when trains are travelling in opposite directions through the territory, one of the trains will be controlled to take a siding, thus permitting the other train to pass, regardless of the routes stored in the system, depending upon the relative location of the opposing trains, and after the trains have met, the train that takes the siding automatically picks up the remainder of the stored routes.

Manual cancellation is provided for all routes or portions of routes whether they are automatically or manually set up. This manual cancellation of an automatic route does not in itself cancel the memory codes for that particular route, however, the control office equipment also includes apparatus and circuitry for the cancellation of selected memory codes that are stored in the matrix and also for the cancellation of all memory codes in the matrix.

In the illustrated embodiment of the present invention, the number of manual control devices required on the control panel is reduced to a miniumum to facilitate and simplify the operation on the part of an operator by dividing the control territory into groups of track switches and signals, and making the same manually operable devices effective to store routing information or to select control codes for the control of particular track switches and signals in each of the groups selectively.

Generally speaking, and without attempting to define the scope of the present invention, the control panel on the control machine is divided into a number of similar control sections, the total number of sections required being governed by the number of track switches or signals to be controlled by separate controls in any one group. Each of these panel sections has manually operable devices for respectively designating the controls for the entrance and exit ends of a route in a group of switches and signals.

Referring to FIG. 1 the first panel section PS1, for example, controls a first or number one track switch and/or a first or number one signal in the respective groups, the control for any one group being connected to one time in accordance with the manual designation of the associated group as being the one for which the information is to be stored or the codes are intended to be transmitted. Similarly, the second panel section PS2 controls a second or number two track switch and/or a second or number two signal in the respective groups. The third panel section similarly controls a third track switch and/or signal that has to have separate controls in all of the groups having such a switch or signal. In this manner, the controls are built up for the different switches and signals until the maximum number of track switches or signals having separate controls for any group is reached. Thus, the number of panel sections required is in accordance with the greatest number of different track switch or signal controls required in any one group. If the entrance to a route is a number one signal and the exit is a number two signal in a designated group, the appropriate button on the panel section PS1 is operated followed by the appropriate button on the panel section PS2.

The track layout for which this embodiment of the present invention is illustrated in FIG. 2, comprises a main track 50 to which a passing siding 51 is connected by track switches A–1SW and B–1SW. The main stretch of track 50 has a second parallel track 52 connected thereto for double direction traffic by cross-over switches C–1SW and C–2SW. Eastbound traffic on the main track 50 is governed by signals A–1E, B–1E and C–1E. Eastbound traffic leaving the siding 51 is governed by the signal B–2E. Eastbound traffic on the track 52 is governed by the signal C–2E. Westbound traffic on the main track 50 is governed by the signal C–1W, B–1W, and A–1W. Westbound traffic on the siding 51 is governed by the signal A–2W. Westbound traffic on the siding 52 is governed by the signal C–2W.

The track layout for the purposes of the present disclosure is divided into groups A, B and C. The switches and signals prefixed by the reference letter A, such as A–1SW and A–2W, are all in group A. Similarly the switches and signals in group B are prefixed by the reference character B, and the switches and signals in group C are prefixed by the reference character C.

In group A the main track is divided into track sections A–1EA, A–1T and A–1WA. The track sections A–1EA and A–1WA detect a train entering the group A location travelling east and west respectively. The track section A–2WA is used to detect the presence of a westbound train entering the group A location on the siding 51.

In group B the track section B–1EA detects an eastbound train entering the group B location and the track section B–1WA detects a westbound train entering the group B location. Track section B–1T is provided also in group B, and track section B–2EA detects an eastbound train entering the group B location on the siding 51.

Similarly in group C, track sections C–1EA and C–2EA detect eastbound trains entering the group C location on tracks 50 and 52 respectively. Track sections C–1T and C–2T are provided on the tracks 50 and 52 respectively. Track sections C–1WA and C–2WA detect westbound trains entering the group C location on the tracks 50 and 52 respectively.

Those switches and signals which are prefixed by the numeral 1, such as A–1SW and A–1E are considered to be the number one signals and switches in its group and the signals prefixed by the reference numeral 2, such as A–2W, are considered to be the number two signal in its group. It is to be noted that there is only one switch in each group A and B, and two switches, C–1SW and C–2SW in group C.

In actual practice there of course could be many more than two switches and two signals in any particular group and a greater number of control panels PS would be provided as hereinbefore described.

Adjacent the track section A–1EA is an inductive wayside coil ED which is influenced by a train approaching the signal A–1E, and similar wayside coils WD1 and WD2 are located adjacent the track section C–1WA and C–2WA respectively to be influenced by a westbound train approaching the signals C–1W and C–2W respectively. These wayside inductive coils ED and WD transmit train identification information to the central office for identifying a train entering the track layout. These coils are influenced by distinctive coils located on the locomotive and may be so connected as shown in a train identification system described in U.S. Patent No. 2,817,012 to which reference is made for a more detailed description thereof.

Indication relays are provided for the switches and signals, and track sections in the track layout. These relays are selectively operated by suitable code communication apparatus in a manner well-known in the art by the presence of trains in the various track sections of the track layout, the position of the switches and the aspects of the signals. As shown in FIG. 2, an indication relay is provided for each track section in the layout and they are identified with similar reference characters with the suffix K. For example, the relay A–1EAK is operated to close its front contacts when a train is occupying the track section A–1EA. The indication relay A–1NWK is operated when the switch A–1SW is in a normal position, and the relay A–1WRK is operated when the track switch A–1SW is in a reverse position. These indication relays are all conventional magnetic stick relays wherein their contacts are operated to one position in response to an impulse of one polarity and are operated to the other position in response to an impulse of another polarity as is well-known in the art.

For each identified train that is to travel through the territory controlled by this system there is provided a relay TIK. For example, a relay 12TIK is provided for train No. 12 that is operated when train No. 12 enters the track layout. As a further example, a relay 21TIK is provided to be operated when train No. 21 enters the track layout. These relays may be controlled by the train describer or identification system described in the previously mentioned U.S. Patent No. 2,817,012. The designations 12 and 21 are used to denote a particular east and westbound train respectively in this disclosure. The even numbered designation denoting an eastbound train and the odd number designation denoting a westbound train.

The console type control machine which may be used with the system of this invention comprises a control panel P which has a plurality of panel sections PS. The panel section PS1 being for the number one signals and switches; the panel section PS2 being for the number two switches and signals, etc. A row of buttons A–PB, B–PB, and C–PB, are provided to select the group location A, B, or C respectively, in which the signals and switches to be designated are located.

Each of the panel sections PS has control buttons mounted thereon as illustrated in FIGS. 1 and 5A. These buttons are assumed to be push-pull buttons having a neutral position in which they are biased. Considering the buttons on the panel PS1 as typical, at the top of the panel buttons 1NB and 1RB are disposed side by side for the designation for the respective normal and reverse positions of a track switch. The button directly below the switch control buttons is a "stop" control button as designated in the drawings for cancelling a route that is set up in the system. Below the "stop" button control route designating buttons 1WPB and 1EPB are disposed side by side for the designation of controls for governing westbound and eastbound signals respectively. Below the signal control buttons is a start button so designated on the drawings for initiating the transmission of a control to an individual switch or stop control.

On the control machine there is also located a train identification panel IP upon which are a plurality of push buttons, one row of which is numbered consecutively from 1 through 9, and another row of which is numbered consecutively by tens from 10 through 90. When storing a train route for a distinctly identified train, combinations of these buttons are operated to designate a particular train. For example, if a route is to be stored for train No. 12, the push button 10 and 2 is operated. If a route is to be stored for train No. 21, the push buttons 20 and 1 are operated.

There is also provided a button A–MPB for designating either an automatic or manual control of the system. A push button RI–CCPB is provided to be pushed for storing a route that has been set up in the system. By pulling the button RI–CCPB any portion of a stored route may be cancelled as will be evident hereinafter. Push buttons MCPB are provided for cancelling out all of the routes that are stored in the system. A location cancel push button LOCPB is provided for cancelling out a group location designation.

A plurality of relays 1TDR through 4TDR (FIG. 5G) are provided to be energized in certain combinations for identifying a particular train in the system. For example, if train No. 12 is to be identified upon the pushing of the buttons 10 and 2, the relays 1TDR, 3TDR and 4TDR are picked up.

A relay A–M (FIG. 5B) is provided to be operated in response to the push button A–MPB for conditioning the system for either storing a route or manually setting up a route.

Group location relays 1L and 2L (FIG. 5G) are provided to be energized in combination to designate the group location A, B or C depending upon the operation of the group location repeater relays A–LCP, B–LCP, or C–LCP. For example, if a route is to be stored for the group A location, both relays 1L and 2L are energized; if a route is to be stored for the group B location, the relay 1L only is energized.

Entrance relays 1N and 2N are provided to be energized in certain combinations to designate the track on which the train is to arrive for the route to be stored. These relays are selected in accordance with the operation of relays WG, EG, EGP, WGP, and EN. The relays EG are provided to be energized upon the operation of an eastbound button EPB to designate that the entrance end of the route is an eastbound signal, and the relays WG are energized upon the operation of a WPB button to designate that the entrance to the route is a westbound signal.

The relays EGP and WGP are selectively energized in accordance with the operation of a respective EG or WG relay and control the entrance relay EN. The relays 1EG and 1WG when first operated designate that the entering signal is a No. 1 signal and those relays 2EG and 2WG when first operated designate that the entrance end of the route is a No. 2 signal.

The relays 1X and 2X are provided to be energized in combination to designate the exit end of a route and these relays are controlled by an exit relay EX together with a relay 1EG, 1WG, 2EG, or the like.

Relays EC and WC are also provided to be energized depending upon whether an EGF or WGP relay is operated to designate that the route to be stored is either an eastbound or a westbound route respectively.

The relays 1TDR, 2TDR, 3TDR, 4TDR, 1L, 2L, 1N, 2N, 1X, 2X, EC, and WC, are arranged in a bank having a fan of contacts to selectively store the routes in a magnetic core memory matrix.

The memory matrix M, which may be removably attachd to the control panel in order to substitute another matrix at required times, is a ferrite core single layer matrix having magnetic cores at the junction of the rows R and columns CN of the matrix. The ferrite cores in the matrix possess by virtue of the composition and processing a rectangular hysteresis loop. Because of this characteristic each core possesses the ability to remain indefinitely and reliably in either one of two magnetic states, namely, a "one" state or a "zero" state. The "one" state is regarded as the positive flux density state, and the "zero" state is regarded as the negative flux density state. The theory of operation of ferrite cores is thoroughly explained in existing literature, therefore, a further explanation of their operation is unnecessary. The matrix M has a plurality of wires threaded through each of the cores in a conventional manner with certain of the wires being connected in the system for reading in or storing the information and certain of the wires for reading out the information. Each row R of the matrix is capable of indefinitely memorizing a portion of a route, the particular route memorized being governed by the combination of cores in the "one" state in a particular row. The number of rows R and columns in the matrix M depends upon the number of routes that are to be stored in the system. A more detailed description of the matrix M as used with this embodiment of the invention will be describd in connection with the operation of the system.

A read-in relay RI is provided to initiate the application of energy to the storage matrix M. A read-in repeater relay RIP which is a slow drop-away relay, is provided to restore the system to normal once a route has been read into the matrix M.

A code cancel relay CC and its repeater CCP are provided to cancel a selected portion of a route that is stored in the matrix M. A relay MCL is provided to cancel all of the routes stored in the matrix M.

A plurality of relays TL, such as 12A1TL, 12B1TL, or 12B2TL are provided to follow the train movement through the control territory and are operated upon the approach of a train to a respective group location. A relay TL is provided for each train that has a route stored in the system for each entrance point of every possible route in each group location. For example, the train following relay 12A1TL is provided for train No. 12 approaching group location A at a No. 1 signal on the main track 50. The relay 12B2TL, for example, is provided for train No. 12 approaching the B location at a No. 2 signal.

For each train following relay TL there is provided a train following repeater relay, such as 12A1TLP, 21C1TLP, and so on. These train following repeater relays serve to hold the train movements until it can read out a route for a subsequent location by the operation of a train following relay in a subsequent group. The train following relays for subsequent groups are selected depending upon the actual position of the train in a preceding group. That is, the train following repeater relay TLP in combination with a respective train following relay TL provides continuity of route and train location through the territory.

The contacts of the train following relay are so arranged to cause the bank of read-in relays TDR, 1L and the like, to select one of the rows R1 through R8 of the matrix M.

A read-out relay RO is provided to apply a negative current to the selected row R1 through R8 of the matrix M. A read-back relay RB is provided to reinsert the stored data or route that is read out of the matrix by the operation of the relay RO.

A plurality of transistor digital read-out units or multivibrators MV1 through MV8 are provided for the columns CN of the matrix M. One read-out unit MV is provided for each column CN. These read-out units MV are operated when a core in its associated column is changed from its "one" to its "zero" state. Referring to FIG. 3, a schematic diagram for a transistor digital multivibrator MV is illustrated. Each unit MV is comprised of an input transformer 780, gating diodes 782, an amplifier stage 783, and a flip-flop multivibrator stage 784. A plug 785 may be provided to be operatively inserted in a receptacle 786 which may be located on the control machine.

Each multivibrator MV controls one of a plurality of relays in a read-out relay bank, and are operated in a certain combination to energize the selected relays of the read-out relay bank. This read-out relay bank comprises location relays 1LRO and 2LRO which are energized in combination according to the group location, A, B or C that corresponds to the stored route that is being read out. Relays 1NRO and 2NRO are provided to be energized in certain combinations by their respective multivibrators MV depending upon whether the entrance of the route that is read out is at a No. 1 signal or a No. 2 signal. Relays 1XRO and 2XRO are provided to be operated depending upon whether the exit point of the route that is read out is either a No. 1 signal or a No. 2 signal. A relay ERO and WRO is provided to be operated depending upon whether the route that is read out is for an eastbound train or a westbound train. The contacts of these read-out relays are so arranged in a fan arrangement to select, depending upon the combination of their contacts in the energized or deenergized position, a particular route determining relay. The read-out relays also have contacts to control the selection of the route that is read back into the matrix M.

A route determining relay RD is provided for each portion of a route that is possible in the track layout, for example, relay A–1E1RD is operated upon the reading out of a route in the group A location that has an entering point at a No. 1 eastbound signal and an exit point at a No. 1 signal. Similarly, for example, a relay B–2E1RD is operated when the route that is read out is in the group B location with an entrance point at a No. 2 eastbound signal and an exit point at a No. 1 signal. The route determining relays RD initiate the selection of a corresponding route storage and selection relay RT.

Relays A–LC, B–LC and C–LC are provided to select the proper group location A, B or C depending upon the particular route determining relay RD which is picked up. Relays S1 and S2 are provided to be selectively energized as determined by a respective route determining relay RD for selecting either a No. 1 signal or a No. 2 signal. Relays E and W are provided to be selectively energized depending upon relay RD to select whether a route is an eastbound or a westbound route.

A relay N is provided to cause the location selecting and signal selecting relays and the directional relays E or W to first designate the entrance end of the route. A slow pick-up relay XF is a transfer relay which causes the identification of the signals to be subsequently designated as the exit end of the route. In this connection an X relay is provided that determines that the exit end of the selected route has been established. A clear-out relay CO restores the system to normal including deenergizing the particular route determining relay RD when a route selection and storage relay has been picked up.

For each group location there is an LCP relay, such as an A–LCP for example, which conditions the system for selecting a route in a respective group location, such as group A for example.

For each signal in the track layout there is provided a GLP relay, such as relay A–1EGLP, A–1WGLP, B–1EGLP, and the like, which serve to condition the system for clearing a respective signal at the entrance end of a selected route. For example, the initial picking up of the A–1EGLP selects that the signal 1E is the entering signal of the system. This relay also controls an exit auxiliary relay to prevent an opposing signal as being the entrance point of a route simultaneously.

An exit auxiliary relay, such as A–1EXZ, A–1WXZ, B–2EXZ, and the like, are provided for each signal in the track layout. The circuitry is so arranged that all of the exit auxiliary relays are energized that are associated with an opposing signal in a group location that is possible to be an exit point of a route. For example, inasmuch as the signal A–1W and A–2W are able to be the exit points of a route having entrance at the signal A–1E, both of these relays are selected by the relay A–1EGLP.

Also there is provided for each signal in the track layout an exit relay, such as A–1EX, A–2WX, B–1EX, and the like which select the exit point for the group. This relay is selected after the previously mentioned relay XF causes a transfer of the energy as governed by the route determining relay RD. Once a particular GLP relay is energized and a particular WX relay is energized, a respective route storage and selection relay RT is picked up.

There is a route selection and storage relay RT for every possible route in the territory. For example, there is a relay A–1E1RT for selecting and storing a route in the A location which extends from the No. 1 eastbound signal to the No. 1 westbound signal.

These route selection relays are effective to condition the system for transmitting the proper switch and signal controls to a field station for a respective route. The route relays also store the route selection until conditions permit the transmission of a code to the field station.

Switch control relays WN and WR are provided for each switch in the territory. The energizing of the relay WN controls the switch to a normal position and the energizing of the relay WR controls the switch to a reverse position. These relays are selected by a route storage relay RT.

For each group location there is a block control relay A–1EBP, such as A–1EBP for the group A location, B–1WBP for the B location for example, which are provided to be energized when a train is approaching a respective location with intervening track sections between the train and the respective group location. A directional stick relay, such as relay A–ES, A–WS, and B–ES, and the like, are provided for a respective location for each direction of traffic movement. The directional stick relays are selected by a corresponding block repeater relay, such as the relay A–1EBP and provide additional stick circuits for opposing route selection and storage relays RT, relays GLP, and also prevent the transmission of a control to the field station of a route which opposes that route storage and selection relay which has already been selected.

For each direction of traffic along the main track in each group location there is provided a directional priority relay A–1E (for eastbound traffic), and A–1W (for westbound traffic), for example, which are selected by a route storage and selection relay RT that corresponds to the same direction of traffic. These relays condition the system to accomplish an automatic meet of opposing trains that have conflicting routes stored in the system. There is a take siding relay TS for each switch in the control territory which is selected when trains running in the opposite direction are approaching each other and having a passing siding therebetween. The relay A–1TS is for the No. 1 switch in the group A location, and the relay B–1TS is for the No. 1 switch in the B location. These relays condition the circuitry so that a route selection and storage relay RT will cause a reverse control switch relay WR to be energized for routing a train onto a siding automatically even though the route that is read out of the system is for the main track when trains travelling in opposite directions have stored routes on the same track.

There is also associated with each switch a leave siding relay, such as B–1LS, and A–1LS, for example, which controls the operation of a switch to its reverse position to permit a train on a siding to continue according to its stored route after an automatic meet.

Lock indication relays LK, such as relay A–1LK, B–1LK, for example, are provided for each switch in the track layout to prevent an improper switch control when a corresponding portion of the track layout is occupied or has a signal cleared for movement into it.

A route check stick relay RCS and its repeater RCSP is provided for each group location. For example, relay A–RCS, and relay A–RCSP are provided for the group A location. These relays prevent the sending of more than one route for a train in a particular group location and insure that the train for which a route has already been read out has left that location before another route is transmitted for the same location.

A change relay CH is provided for each group location, such as A–CH and B–CH which is picked up to cause the transmission of a code to the field station associated with a respective group. Also, a location code relay, such as A–LCC and B–LCC is provided for each group location which prevents more than one code from being transmitted from the central control office to the field station simultaneously. A respective location code relay LCC completes the selection of the code and a code is transmitted to clear certain of the signals and control an associated switch in accordance with contacts on a switch repeater relay WLP and a route storage and selection relay RT.

A more detailed description of the apparatus and circuitry will be described in connection with the description of the operation of the system.

Assuming that the operator wishes to store a route for a train No. 12 that is scheduled to approach the territory travelling easterly on track 50, which route is to extend from the track section A–1EA over the switch A–1SW in a reverse direction and on to the siding 51, and then continuing easterly off the siding 51 through the switch B–1SW back on to the main track 50 to continue on the main track through to the rest of the territory.

The first group of switches and signals involved in the route to be stored for train No. 12 are located in group A as shown on FIG. 2. In group A the signal A–1E is the entering signal for the train and the opposing signal A–2W controlling westbound traffic on the siding 51 is the last signal in this A location.

The operator first presses the button A–MPB to condition the system for storing a route. He then presses the button A–PB to designate that the portion of the route to be stored involves the switches and signals in the group A location. He then presses the button 1EPB on the panel section PS1 thereby designating that the entering signal is a number one eastbound signal. Then he operates the push button 2WPB on the panel section PS2 designating that the exit signal for the portion of the route in group A is a No. 2 westbound signal.

The train designation buttons 10 and 2 are operated to designate that the train for which this route is to be stored is train No. 12. Lastly, the push button RI–CCPB is pressed which causes the system to indefinitely store that portion of the route through the group A location designated by the previous operation of push buttons A–PB, 1EPB and 2WPB, namely, a route for an eastbound train 12 from the main track onto the siding 51; and also returns the system to normal for storing the next portion of the route in the system.

The next portion of this route to be stored is in group B location, the entering signal being signal B–2E and the exit point being the opposing signal B–1W. For this portion of the route the operator presses the push button B–PB designating that this portion of the route to be stored is in the group B location. On the panel section PS2 he first presses the button 2EPB which designates that the entering signal for this section of the route is the No. 2 eastbound signal B–2E; he then presses the button 1WPB on the panel section PS1 designating that the exit point for this portion of the route is the No. 2 opposing signal B–1W. The train identification buttons 10 and 2 are again operated for designating that this portion is for the train No. 12. Finally, the button RI–CCPB is pressed which causes the system to store indefinitely the designated route through the group B location and return the system to normal.

In the illustrated track layout, the final portion of the route for train No. 12 is through the group C location on the main track 50 from the signal C–1E to the signal C–1W. Thus, the operator presses the button C–PB to designate the group C location. The train identification buttons 10 and 2 are operated to designate that the route is for train No. 12. The button 1EPB on the panel section PS1 is operated to designate that the entering signal in this group C is the No. 1 eastbound signal C–1E. After pressing the button 1EPB, the operator presses the button 1WPB on the panel section PS1 to designate that the exit point for this portion of the route is the No. 1 opposing signal C–1W. The push button RI–CCPB is lastly pressed to store indefinitely this last section of the route in the system and return the system to normal. If no other routes are to be stored in the system, or the operator wishes to operate the switches and signals from the central control office, he pulls the push button A–MPB to condition the system for manual operation.

The operation of the system with regard to the storing of the portion of the route for an eastbound train No. 12 through the group A location in response to the previously described operation of the various buttons on the control machine in the control office will now be described. In response to the operation of the push button A–MPB (FIG. 5A), the magnetic stick relay A–M (FIG. 5B) is energized to close its front contacts, by a circuit which extends from (+) and includes contact 60 of the push button, wire 61, and the winding of the relay A–M to a source of energy C.

When the buttons 10 and 2 are operated, the train describer relays 1TDR, 3TDR and 4TDR (FIG. 5G) are picked up. The circuit for energizing the relay 1TDR extends from (+), and includes contact 62 of the push button 2, wire 63, front contact 64 of the relay A–M, wire 65, back contact 66 of the relay 12A1TL, back contact 67 of the relay 12B1TL, back contact 68 of the relay 12B2TL, wire 69, back contact 70 of relay 21A1TL, wire 72, back contact 73 of relay 12C1TL, back contact 74 of relay 21B1TL, wire 75, back contact 76 of relay 21C1TL, wire 77, and the lower winding of relay 1TDR to (–). The relays 3TDR and 4TDR are energized by a circuit which extends from (+) and includes closed contacts 78 and 79 respectively of the push button 10, normally closed contact 80 of push button 20, normally close contact 81 of push button 30, wires 82 and 83 respectively, front contacts 84 and 85 respectively of the relay A–M, wires 86 and 87, back contacts 40 and 41 of the relay 12A1TL, back contacts 42 and 43 of the relay 12B1TL, back contacts 526 and 527 of the relay 12B2TL, wires 44 and 45, back contact 46 of the relay 21A1TL, wire 48, back contacts 88 and 89 of the relay 12C1TL, back contact 90 of the relay 21B1TL, wires 91 and 92, back contact 93 of the relay 21C1TL, wires 94 and 95, and the lower windings of relays 3TDR and 4TDR respectively to (–). Various back contacts of the train following relays TL are included in the circuits for picking up the train identification relays TDR to prevent the designating of train identification information during the storing of a route while the presence of a train is initiating a read-out of a route already stored in the system. The relays TDR are held picked up by a stick circuit which extends from (+) and includes a contact 104 of the RSPB, wire 103 (in cable 105), front contact 96 of the relay RB, back contact 97 of the relay RO, front contact 98 of the relay RIP, back contact 98' of the relay CCP, wire 99, front contacts 100, 101 and 102 of the relays 1TDR, 3TDR and 4TDR respectively, and their respective upper windings to (–).

Figure 5C:
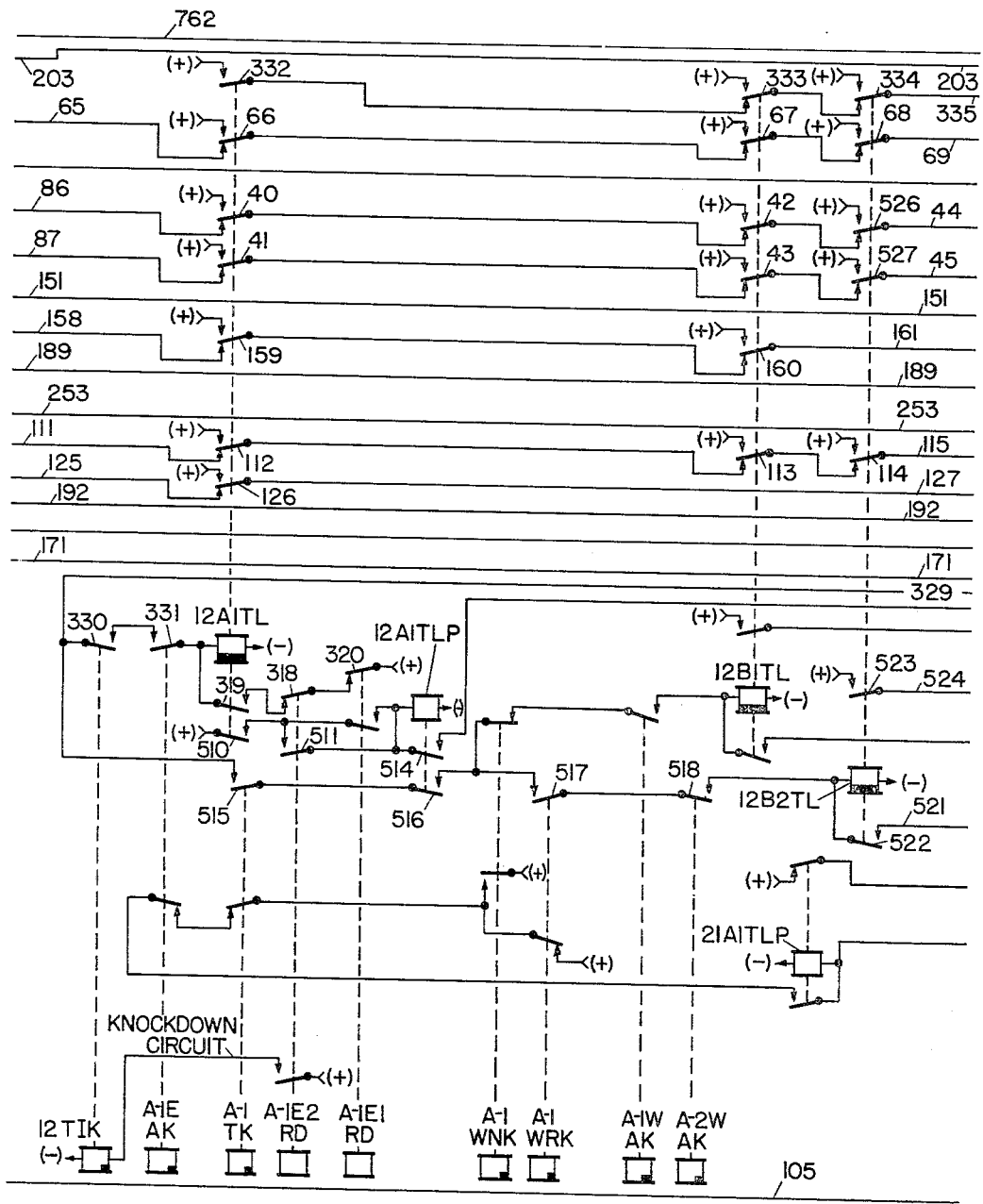
Figure 5D:
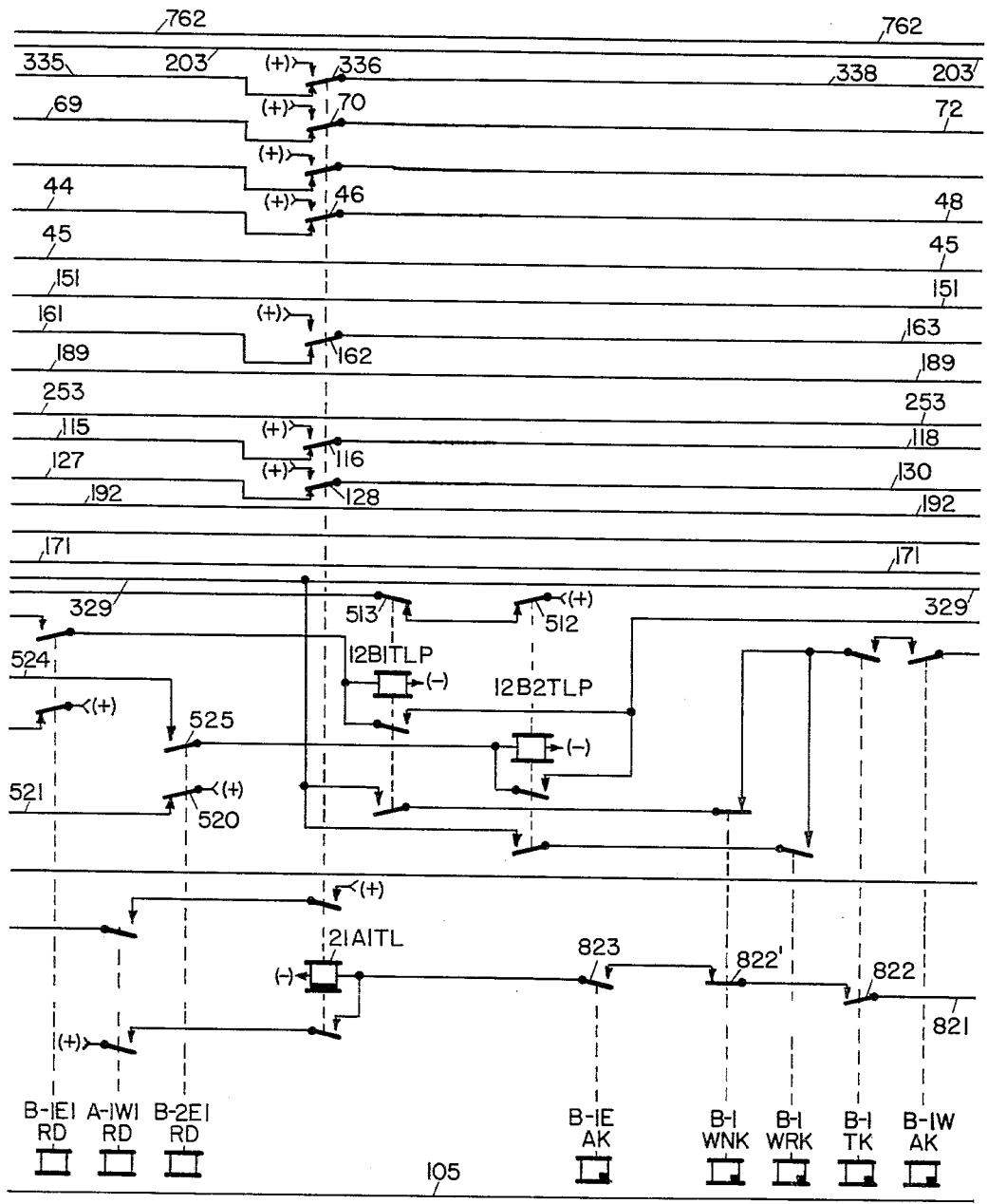
Figure 5E:
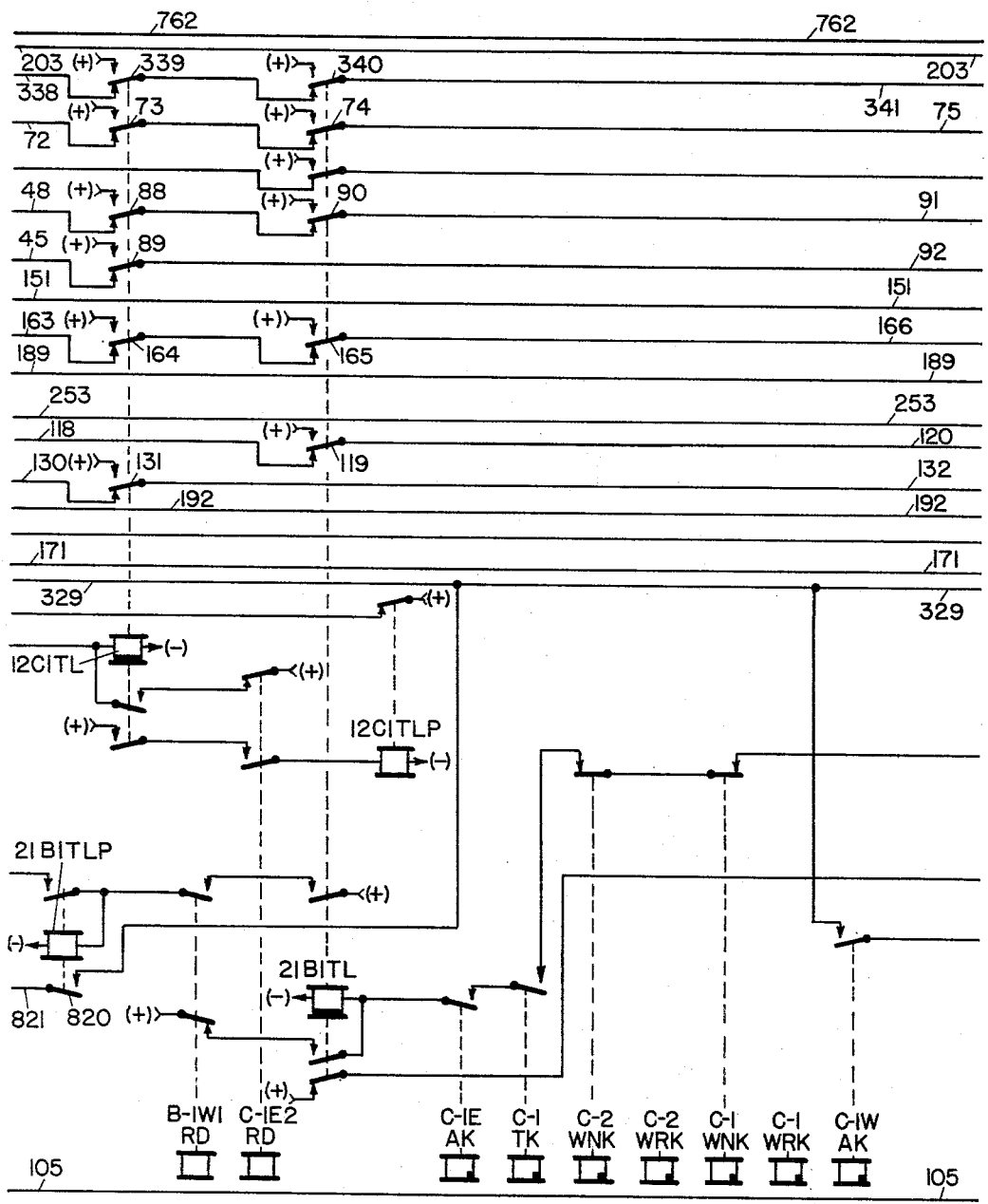

When the operator presses the group location button A–PB, the relay A–LCP is picked up through the multiconductor cable 105 which is diagrammatically shown as extending across the bottom of the drawings 5A, 5B, 5C, etc., in order to simplify the illustrations of the system. In FIG. 5K this pick up circuit is schematically shown as extending from the cable 105 through a wire 106, and the lower winding of the A–LCP relay to (–). The relay A–LCP is held up by a stick circuit which extends from (+) and includes closed contact 260 of the button LOC–PB, back contact 261 of relay A–CH, front contact 262 of relay A–LCP, wire 263, back contact 264 of relay B–LCP, wire 265, front contact 266 and the winding of relay A–LCP to (–).

In response to the picking up of the relay A–LCP, the relays 1L and 2L (FIG. 5G) are picked up. The picking up of both the 1L and 2L relays conditions the system for storing a route through the group A location in the track layout. The relay 1L is picked up by a circuit which extends from (+) and includes front contact 107 of relay A–LCP (FIG. 5A), back contact 108 of relay B–LCP, wire 109, front contact 110 of relay A–M, wire 111, back contact 112 of relay 12A1TL, back contact 113 of relay 12B1TL, back contact 114 of relay 12B2TL, wire 115, back contact 116 of relay 21A1TL, wire 118, back contact 119 of relay 21B1TL, wire 120, and the lower winding of relay 1L to (–). The circuit for picking up relay 2L extends from (+) and includes front contact 121 of relay A–LCP, back contact 122 of relay C–LCP, wire 123, front contact 124 of relay A–M, wire 125, back contact 126 of relay 12A1TL, wire 127, back contact 128 of relay 21A1TL, wire 130, back contact 131 of relay 12C1TL, wire 132, back contact 133 of relay 21C1TL, wire 134, and the lower winding of relay 2L to (—). Various back contacts of the train following relays TL are included in the circuits for picking up the relays 1L and 2L to prevent the storage of group location information when a train following relay TL is transferring group location information during the automatic read-out of a stored route. The relays 1L and 2L are held picked up by the same stick circuit for the relays TDR and includes front contacts 135 and 136 of the relays 1L and 2L respectively.

In response to the operation of the push button 1EPB, the relay 1EG is energized by a circuit which extends from (+) and includes contact 138 of the push button 1EPB (FIG. 5A) and the winding of relay 1EG to (—).

Figure 5G:
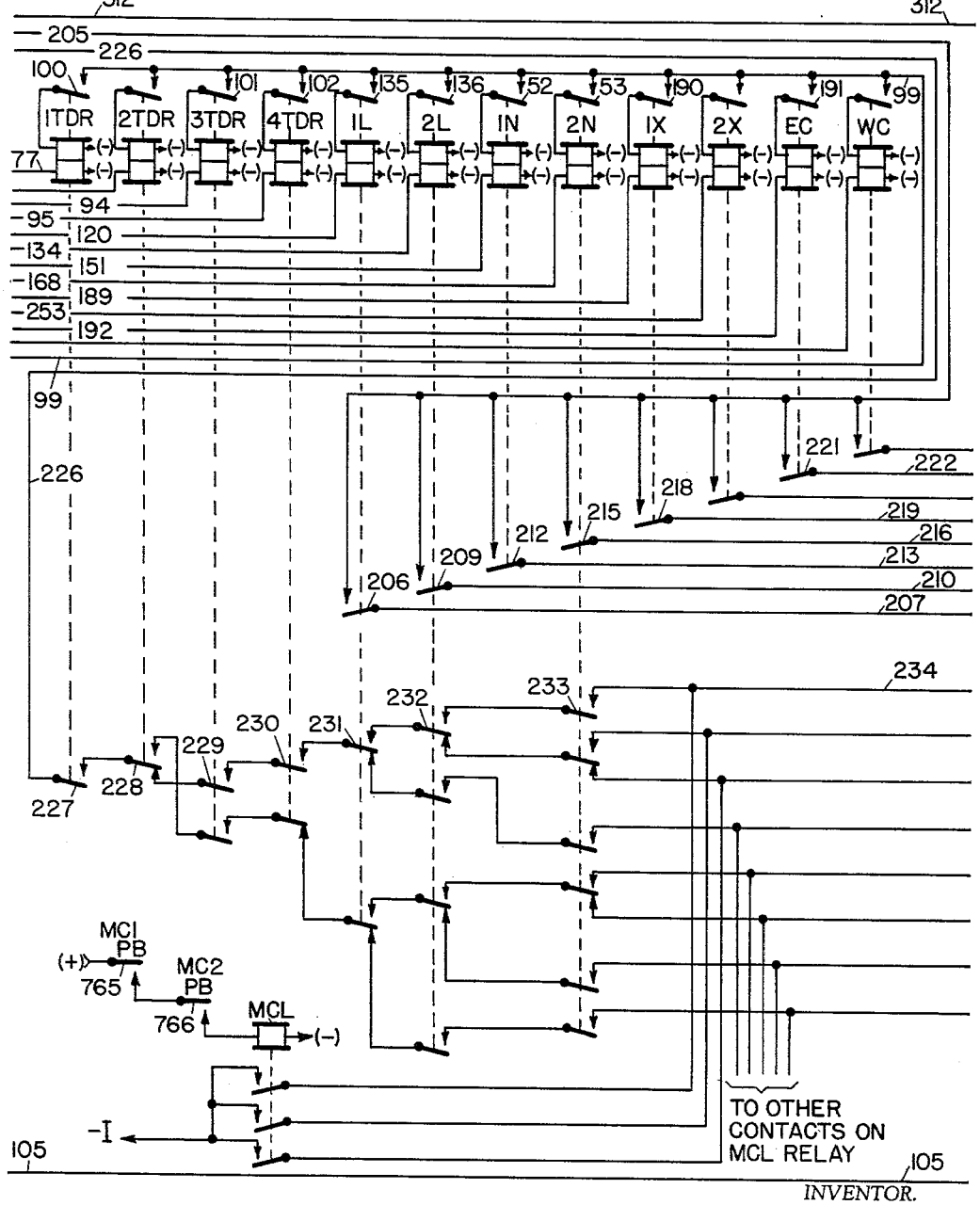

Upon the picking up of the relay 1EG, the relays 1N and 2N are energized (FIG. 5G). By picking up both relays 1N and 2N it is signified that the entrance point for this section of the route is past a number one eastbound signal, in this example A–1E. The circuit for picking up the relay 1N extends from (+) and includes front contact 145 of relay 1EG, wire 146, back contact 147 of relay 2WG, back contact 148 of relay 2EG, back contact 149 of relay EN, front contact 150 of relay A–M, wire 151, and the lower winding of relay 1N to (—). The circuit for picking up the relay 2N extends from (+) and includes front contact 152 of relay 1EG, wire 153, back contact 154 of relay 3WG, back contact 155 of relay 3EG, back contact 156 of relay EN, front contact 157 of relay A–M, wire 158, back contact 159 of relay 12A1TL, back contact 160 of relay 12B1TL, wire 161, back contact 162 of relay 21A1TL, wire 163, back contact 164 of relay 12C1TL, back contact 165 of relay 21B1TL, wire 166, back contact 167 of relay 21C1TL, wire 168, and the lower winding of relay 2N to (—). The relays 1N and 2N are held picked up by stick circuit over wire 99 and the front contacts 52 and 53 of the relays 1N and 2N, respectively.

In response to the picking up of the relay 1EG, the relay EGP is picked up by a circuit which extends from (+) and includes front contact 140 of relay 1EG, wire 141, back contact 142 of relay 2EG, back contact 143 of relay 3EG, back contact 144 of relay WGP, and the winding of relay EGP to (—).

After the relay EGP has picked up the relay EN is energized by a circuit which extends from (+) and includes front contact 169 of relay EGP (FIG. 5B), and the winding of relay EN to (—). The picking up of the relay EN opens the previously described pick up circuits for the relays 1N and 2N by the opening of back contacts 149 and 156 of relay EN. It should be noted that even though their pick up circuits are opened the relays TDR, L, N, X and C remain stuck up as called until execution takes place. The relay EGP is held picked up by a stick circuit which extends from (+) and includes front contact 170 of relay RIP (FIG. 5F), wire 171, front contact of relay A–M (FIG. 5B), front contact 173 of relay EGP and the winding of relay EGP to (—).

Upon the picking up of the relay EN, the release of the button 1EPB causes the relay 1EG to drop away, and the relay EX is picked up by a circuit which extends from (+) and includes back contact 175 of relay 1WG (FIG. 5A), back contact 176 of relay 1EG, wire 177, back contact 178 of relay 2WG (FIG. 5B), back contact 179 of relay 2EG, back contact 180 of relay 3WG, back contact 181 of relay 3EG, front contact 182 of relay EGP, front contact 183 of relay EN, and the winding of relay EX to (—). Thus, upon the actuation of the button 1EPB the circuit is so conditioned that the 1N and 2N relays are picked up followed by the picking up of the entrance conditioning relay EN, which in turn is followed by the picking up of the exit relay EX to prepare the system for designating the exit end of the portion of the route in group A location. The relay EN is held picked up through a front contact of the relay EGP and the relay EX is held picked up through front contact 183 of relay EN.

In response to the subsequent operation of the push button 2WPB on the panel section PS2, relay 2WG is picked up by a circuit which extends from (+) and includes contact 139 of the push button (FIG. 5B) and the winding of the relay 2WG to (—).

Upon the picking up of the relay 2WG with the relay EX picked up the relay 1X is energized which designates that the exit end of this portion of the route is past the opposing signal A–2W on the siding 51. The circuit for picking up the relay 1X extends from (+) and includes front contact 185 of relay 2WG, back contact 186 of relay 2EG, front contact 187 of relay EX, front contact 188 of relay A–M, wire 189, and the lower winding of relay 1X, to (—). The relay 1X is held up by the previously described stick circuit through its front contact 190.

Upon the picking up of the relay EGP, as described aforehand, the relay EC was energized to denote that the route to be stored is for an eastbound train. This pick-up circuit extends from (+), and includes front contact 193 of relay EGP, front contact 194 of relay A–M, wire 192, and the lower winding of relay EC, to (—). The relay EC is held up through its front contact 191.

To summarize the operation of the apparatus and circuitry up to this point for storing a portion of a route having an entrance point at signal A–1E and an exit point at the signal A–2W for train No. 12 (see FIG. 5G), the train identification relays 1TDR, 3TDR and 4TDR are energized thus designating a particular combination for the storage of a route for train No. 12. Relays 1L and 2L are energized thus designating that the route to be stored is in group A location. The relays 1N and 2N are both energized thus designating that the entrance to the route is at the signal A–1E in group A. The relay 1X is energized which designates that the exit end of this portion of the route is through the second signal A–2W in group A, and the relay EC is energized thus designating that the route is for an eastbound train. It should be noted that up to this point if the operator should make a mistake, that is push an improper button, he can push the reset button RSPB, which will open the stick circuit of the relays set up, after which he can start over.

To transfer this designated information into the matrix M, the operator presses the button RI–CCPB (FIG. 5A) which energizes the read-in relay RI (FIG. 5F) by a circuit which extends from (+) and includes contact 200 of the button RI–CCPB, wire 201, front contact 202 of relay A–M, wire 203, and the winding of relay RI, to (—).

Upon the picking up of the relay RI, a current having a value of +½ I is applied to selected columns of the matrix M. The particular columns selected are determined by the position of the relays 1L, 2L, 1N, 2N, 1X, 2X, EC and WC. The column CN1 of the matrix M is energized with +½ I current by a circuit which extends from the +½ I source and includes front contact 204 of relay RI, wire 205, front contact 206 of relay 1L, wire 207, and wire 208 through the cores of column CN1 to a common terminal of the direct current source. The cores in column CN2 are energized with +½ I current through front contact 209 of the relay 2L, wire 210, and wire 211 of the column CN2 to the common terminal of the battery. Similarly column CN3 is energized with +½ I current through front contact 212 of the relay 1N, wire 213 and wire 214. Also column CN4 is similarly energized through front contact 215 of relay 2N, wire 216, and wire 217. Also column CN5 is similarly energized through front contact 218 of relay 1X, wire 219, and wire 220. Column CN7 is similarly energized through front contact 221 of the relay EC, wire 222, and wire 223. Columns CN6 and CN8 are not energized because the relays 2X and WC are deenergized for the storing of a route of this designation.

A certain one of the rows R–1 through R–8 is also energized simultaneously with current having value of +½ I because of the position of the contacts of the relays 1TDR, 2TDR, 3TDR, 4TDR, 1L, 2L, 1N, and 2N. It will be recalled for the train No. 12 that the relays 1TDR, 3TDR, and 4TDR are picked up. Also, that relays 1L, 2L, 1N, and 2N are also picked up for this particular route. Therefore, the row R–1 is energized with +½ I current by a circuit which extends from the +½ I source and includes front contact 225 of relay RI, wire 226, front contact 227 of relay 1TDR, back contact 228 of relay 2TDR, front contact 229 of relay 3TDR, front contact 230 of relay 4TDR, front contact 231 of relay 1L, front contact 232 of relay 2L, front contact 233 of relay 2N, wire 234 through the cores of the row R–1 of the matrix M to the common terminal of the battery.

Those magnetic cores of the matrix M which are energized coincidentally with the +½ I current that is conducted to the columns CN and the row R–1 of the matrix have +1 current applied to them, thus changing them from their "zero" to their "one" state. In this instance, core Nos. 235, 236, 237, 238, 239 and 240 are changed from their "zero" to their "one" state. This particular combination of magnetic cores in their "one" state in row R–1 designates a portion of a route through the group A location for a train No. 12 in an eastbound direction from track No. 50 past signal A–1E and on to the siding 51 to the opposing signal A–2W. This route is now stored indefinitely in the system.

Upon the picking up of the relay RI, the normally energized slow drop away relay RIP is deenergized by the opening of its energizing circuit at back contact 241 of the relay RI.

Upon the dropping away of the relay RIP the relays 1TDR, 3TDR, 4TDR, 1L, 2L, 1N, 2N, 1X, and EC are dropped away by the opening of their stick circuit over wire 99 at front contact 98 of relay RIP, thus restoring these relays to their normally deenergized position.

Simultaneously, the dropping away of the relay RIP opens the stick circuit for the relay EGP (FIG. 5B) thus causing it to drop away. The dropping away of the EGP relay opens the energizing circuit for the relay EN by the opening of contact 169 of the relay EGP, and in response to the dropping away of the relay EN the relay EX is dropped away by the opening of front contact 183 of the relay EN in the stick circuit of the relay EX. The system is now restored to its normal condition and the operator may proceed to store the next portion of the route in the system through the group B location.

In storing this next portion of the route, the same train describer or identification relays 1TDR, 3TDR, and 4TDR are picked up as previously described, because this portion of the route is for the same train No. 12.

For this location the relay B–LCP is picked up in response to the pressing of the button B–PB which interrupts the stick circuit for relay A–LCP at back contact 264 (FIG. 5P) and picks up the relay 1L only. The circuit for picking up the relay 1L is similar to the previously described pick up circuit with the exception that the energy is obtained through the front contact 108 of the relay B–LCP (FIG. 5A). When the operator presses the button 2EPB on panel section PS2 because the entering signal for this portion of the route is signal B–2E, the relay 2EG is energized by a circuit which extends from (+) and includes contact 245 of the button 2EPB (FIG. 5B) and the winding of relay 2EG to (–).

In response to the picking up of the relay 2EG, the relay 1N is energized by a circuit which extends from (+) and includes front contact 148 of the relay 2EG. The remainder of this pick-up circuit is the same as previously described. The picking up of relay 1N only, designates that the entrance for this portion of the route is on siding 51. Also, the relay EGP is picked up by a circuit which extends from (+) and includes front contact 142 of the relay 2EG, back contact 143 of the relay 3EG, back contact 144 of the relay WGP, and the winding of relay EGP to (–). The picking up of the relay EGP energizes the relay EN by its previously described pick up circuit, and upon the release of the button 2EPB, the relay EX is picked up as previously described. The relays EN and EX are held energized by their previously described stick circuits. The picking up of the relay EGP energizes the relay EC as previously described.

The operator then designates the exit end of this portion of the route in the group B location which is the signal B–1W and therefore presses the button 1WPB on the panel section PS1. The operation of this push button picks up the relay 1EG, which in turn picks up the relays 1X and 2X. By picking up both relays 1X and 2X the exit point for this portion of the route is designated as the main track 50 or the opposing signal B–1W. The circuit for picking up the relay 1X extends from (+) and includes front contact 246 of relay 1EG, back contact 185 and 186 respectively of the relays 2WG and 2EG, front contact 187 of the relay EX, front contact 188 of the relay A–M, wire 189, and the lower winding of relay 1X to (–). The circuit for picking up the relay 2X extends from (+) and includes front contact 247 of relay 1EG, wire 248, back contact 249 of relay 3WG, back contact 250 of relay 3EG, front contact 251 of relay EX, front contact 252 of relay A–M, wire 253 and the lower winding of relay 2X to (–).

Thus, it is seen that for storing this section of the route in the group B location for train No. 12, the relays 1TDR, 3TDR, and 4TDR are picked up. The relay 1L is picked up, the relays 1N, 1X and 2X are picked up, and the relay EC is picked up. Upon the subsequent pressing of the button RI–CCPB the relay RI is energized in the manner previously described thus causing the application of +½ I current to be applied to columns CN1, CN3, CN5, CN6 and CN7 of the storage matrix M. Simultaneously, a +½ I current is applied to the row R–3 of the matrix M. Those cores in the row R–3 of the matrix which are also included in the energized columns CN are now changed from their "zero" to their "one" state. In this instance, the magnetic cores 255, 256, 257, 258 and 259 are in their "one" state, thus indefinitely storing this portion of the route in the matrix M. The operation of the relay RI and RIP also restores the system to normal in the manner previously described.

The operator then may designate the remainder of the route to be stored through the group C location in the same manner as previously described by first operating the push button C–PB, designating the proper route, and finally pressing the button RI–CC to store the route in the matrix and restore the system to normal. When the read-in operation has been completed the operator presses the location cancel button LOCPB which drops out the last location relay.

In describing the operation of the system with regard to the automatic control of the switches and signals, the previously described stored route for train No. 12 will be described under conditions where no other trains are present in the track layout. Assuming that the train No. 12 for which the route was previously stored approaches the entrance to the track layout on track 50, the relay 12TIK (FIG. 5C) is energized to close its front contact when the train describer apparatus on the train influences the wayside coil ED.

When the train No. 12 reaches the track section A–1EA, the relay A–1EAK is picked up. The picking up of both relay 12TIK and A–1EAK completes the pick up circuit for the train following relay 12A1TL. This circuit extends from (+) (FIG. 5F) and includes back contact 326 of the relay RI, front contact 327 of the relay RB, back contact 328 of the relay RO, wire 329, front contact 330 of the relay 12TIK, front contact 331 of the relay A–1EAK, and the winding of relay 12A1TL to (—). The relay 12A1TL is held picked up by a stick circuit which extends from (+) and includes back contact 320 of relay A–1E1RD, back contact 318 of relay A–1E2RD, front contact 319 and the winding of the relay 21A1TL to (—). The picking up of the relay 12A1TL energizes simultaneously the read-out relay RO, relays 1TDR, 3TDR, 4TDR, 2N, 1L, and 2L. The circuit for picking up the relay RO extends from (+) and includes front contact 332 of the relay 12A1TL, back contact 333 of the relay 12B1TL, back contact 334 of the relay 12B2TL, wire 335, back contact 336 of the relay 21A1TL, wire 338, back contact 339 of the relay 12C1TL, back contact 340 of relay 21B1TL, wire 341, back contact 342 of the relay 21C1TL, and the winding of the relay RO to (—). The remaining relays (FIG. 5G) that are picked up simultaneously with the relay RO are energized through their previously described pick up circuits by the application of (+) energy through front contacts 66, 40, 41, 159, 112 and 126 of the relay 12A1TL in the respective pick up circuits. When the relay RO picks up, which is subsequent to the picking up of the previously mentioned relays because it is a slow pick up relay, the relays 1TDR, 3TDR, 4TDR, 1L, 2L and 2N are held picked up through the front contact 97 of the relay RO over the previously described stick circuit that includes the bus 99. The selection of the TDR, 1L, 2L, 1N and 2N relays chooses the particular row R in the matrix M that contains the proper route. In this example the row of the matrix selected is row R–1.

The picking up of the RO relay applies —I energy to the row R–1 of the matrix M thus changing those cores in row R–1 which are in their "one" state to the "zero" state. In this example, —I energy is applied to the row R–1 of the matrix M, by a circuit which extends from the —I current source and includes front contact 345 of the relay RO, front contact 346 of the relay RB, back contact 225 of the relay RI, wire 226, front contact 227 of the relay 1TDR, back contact 228 of the relay 2TDR, front contact 229 of the relay 3TDR, front contact 230 of the relay 4TDR, front contact 231 of the relay 1L, front contact 232 of the relay 2L, front contact 233 of the relay 2N, and the wire 234 to the row R–1 of the matrix M.

As will be recalled, the cores 235, 236, 237, 238, 239 and 240 are in their "one" state. Therefore, an output of energy will occur over the wires in column CN1, CN2, CN3, CN4, CN5 and CN7 of the matrix M, which provides an input to the multivibrators MV1, MV2, MV3, MV4, MV5 and MV7.

The operation of these multivibrators MV as caused by the application for input energy picks up the relays 1LRO, 2LRO, 1NRO, 2NRO, 1XRO, and ERO by obvious circuits over wires 347, 348, 349, 350, 351 and 352 respectively through the lower windings of the relays. These relays are held picked up as long as the read-out relay is up by a stick circuit which extends from (+) and includes front contact 311 of relay RO, wire 312, the front contacts and winding of the relays LRO, NRO, XRO, and ERO to (—).

The picking up of the relay combination 1LRO, 2LRO, 1NRO, 2NRO, 2XRO and ERO, closes a circuit to pick up the selected route determining relay (FIG. 5J) A–1E2RD. The circuit for picking up the relay A–1E2RD extends from (+) and includes front contacts 353 and 354 of the relays 1LRO and 2LRO respectively, front contacts 355 and 356 of the relays 1NRO and 2NRO respectively, front contact 357 of relay 1XRO, back contact 358 of relay 2XRO, front contact 359 of relay ERO, back contact 360 of relay WRO, wire 361, and the winding of the relay A–1E2RD to (—). The relay A–1E2RD is held picked up by a stick circuit which extends from (+) and includes back contact 362 of the clear out relay CO (FIG. 5K), wire 363, front contact 364 of the relay A–1E2RD and the winding of the relay to (—). With the picking up of the relay A–1E2RD that portion of the route through the group A location for the train No. 12 has been determined. The picking up of the relay A–1E2RD selects the proper route control; and it also initiates the restoration of the read-out portion of the system to normal as will be described hereinafter.

With regard to the selection of the proper route control, the picking up of the relay A–1E2RD causes the relay N to be picked up by a circuit which extends from (+) and includes front contact 365 of the relay A–1E2RD, wire 366, back contact 367 of the relay CO, back contact 368 of the relay XF and the winding of the relay N to (—). Upon the picking up of the relay N with the relay A–1E2RD energized, the location relay A–LC is energized by a circuit which extends from (+) and includes back contact 369 of the relay CO, wire 370, front contact 371 of the relay A–1E2RD, wire 372, the winding of the relay A–LC, and front contact 373 of the relay N to (—).

In response to the picking up of the relay A–LC, the relay S1 is energized by a circuit which extends from (+) and includes back contact 374 of the relay CO, back contact 375 of the relay XF, wire 376, front contact 377 of the relay A–1E2RD, wire 378, the winding of the relay S1, and front contact 379 of the relay A–LC to (—).

Upon the picking upon of the relay S1, the relay E is energized by a circuit which extends from (+) and includes back contact 380 of relay CO, back contact 381 of relay XF, wire 382, front contact 383 of relay A–1E2RD, wire 384, the winding of the relay E, and front contact 385 of the relay S1 to (—).

Upon the picking up of the relay A–LC, the relay A–LCP is also energized (FIG. 5L) by the application of energy through front contact 386 of the relay A–LC. Thus, the relay A–1E2RD by initially picking up the N relay selected the entrance end of the route which is in the A location as selected by the relay A–LC, is at a number one signal as selected by the relay S–1, and is an eastbound signal as selected by the relay E.

Therefore, upon the picking up of the relays S1 and E with the relay A–LCP energized, the relay A–1EGLP is energized by a circuit which extends from (+) and includes front contact 387 of the relay S1, front contact 388 of the relay E, wire 269, front contact 270 of the relay A–LCP, back contact 271 of the relay A–1EXZ, and the winding of the relay A–1EGLP to (—). The relay A–1EGLP is held picked up by an obvious stick circuit through its front contact 280. Thus, it is seen that the relay A–1EGLP for sending a clearing signal control for the signal A–1E is operated only when it has been determined that it is the route which is read out for the group A location, and involves a No. 1 eastbound signal.

Upon the picking up of the relay A–1EGLP, both relays A–1WXZ and A–2WXZ are energized to condition the circuitry for designating either the opposing signal A–2W or A–1W as the termination point of the route in the group A location. This circuit for picking up the relay A–1WXZ extends from (+) and includes front contact 390 of the relay A–1EGLP, back contact 391 of the relay A–1EX, wire 392, back contact 393 of the relay A–1WR, the winding of the relay A–1WXZ, and back contact 394 of the relay A–1WGLP. The circuit for picking up the relay A–2WXZ extends from (+) and includes front contact 390 of the relay A–1EGLP, back contact 391 of the relay A–1EX, wire 392, back contact 395 of the relay A–1WN, the winding of relay A–2WXZ and back contact 396 of the relay A–2WGLP.

When the relays S1 and E were picked up which designated that an eastbound signal No. 1 was the entering point for this portion of the route, a relay XF was energized by a circuit which extends from (+) and includes fronm contact 398 of the relay E and the lower winding of the relay XF to (—). The relay XF is held picked up by a stick circuit which extends from (+) and includes back contact 400 of relay CO, front contact 401 of the relay XF the upper winding of the relay XF to (—).

The relay XF is a slow pick up relay to insure that the relay A–1EGLP and the A–1WXZ and A–2WXZ relays are energized before the termination or exit point of this portion of the route is established. When the relay XF picks up, its contact 368 moves from back to front to drop away the relay N and to pick up the relay X to establish the exit point for this portion of the route. The relay X picks up the relay A–LC by the closing of front contact 399 when the relay N drops away over the previously described pick-up circuit.

The picking up of the relay XF causes the relay S1 to drop away by the opening of its back contact 375. It also causes the relay E to drop away by the opening of its back contact 381. However, the relay A–1EGLP is still held picked up by its previously described stick circuit. Upon the closing of front contact 375 of the relay XF the relay S2 is energized by a stick circuit which extends from (+) and includes back contact 374 of the relay CO, front contact 375 of the relay XF, wire 402, front contact 403 of the relay A–1E2RD, wire 404, the winding of relay S2 and the front contact 379 of the relay A–LC to (—).

Also upon the closing of front contact 381 of the relay XF with front contact 408 of the relay S2 closed, the relay W is energized by a circuit which extends from (+) and includes back contact 380 of the relay CO, from contact 381 of the relay XF, wire 405, front contact 406 of the relay A–1E2RD, wire 407, the winding of the relay W and front contact 408 of the relay S2 which is now picked up. Thus, by picking up the relays X, A–LC, S2 and W it has been determined that the exit point of the route is in group A at a No. 2 westbound opposing signal.

Upon the picking up of the relay S2 and the relay W, the relay A–2WX (FIG. 5M) is energized by a circuit which extends from (+) (FIG. 5K) and includes front contact 410 of the relay S2, front contact 411 of the relay W, wire 412, front contact 413 of the relay A–LCP, wire 414, front contact 415 of the relay A–2WXZ and the lower winding of the relay A–2WX to (—). The relay A–2WX is held picked up by a stick circuit which includes the front contact 390 of the relay A–1EGLP (FIG. 5L), through the previously described pick up circuit for the relay A–2WXZ and through a front contact 416 of the relay A–2WXZ and front contact 417 of the relay A–2WX. The picking up of the relay A–2WX also closes another energizing circuit for the relay A–1EGLP which extends from (+) and includes front contact 418 of the relay A–2WX, back contact 419 of the relay A–1WN, wire 420, back contact 421 of the relay A–1EXZ, back contact 422 of the relay A–1EX and the winding of the relay A–1EGLP to (—).

Upon the picking up of the relay A–2WX, the relay A–1E2RT is energized by a circuit which extends from (+) and includes front contact 423 of the relay A–1EGLP, back contact 424 of the relay A–1EX, wire 425, back contact 426 of the relay A–1WN, front contact 427 of the relay A–2WX, wire 428, the upper winding of the relay A–1E2RT and back contact 429 of the relay A–1E1RT to (—). The relay A–1E2RT is held picked up by a stick circuit which extends from (+) and includes back contact 430 of the block repeater relay A–1EBP, and the back contact 431 of the track occupancy indication relay A–1TK, front contact 432 of the relay A–1E2RT, the upper winding of the relay, and the back contact 429 of the relay A–1E1RT to (—). When the relay A–1E2RT is picked up, the portion of the described route through the group A location has been selected and is stored until traffic conditions or the condition of the system permit the transmission of the switch and signal controls to the field station.

Upon the picking up of the relay A–1E2RT the reverse switch control relay A–1WR is energized by a circuit which extends from (+) and includes front contact 433 of the relay A–1EAK (FIG. 5L), front contact 434 of the relay A–1E2RT, wire 435, back contact 436 of the relay A–1WN (FIG. 5M) and the winding of the relay A–1WR to (—). The picking up of the A–1WR opens the pick up circuit of the relay A–1WXZ at back contact 393 of relay A–1WR allowing the A–1WXZ to drop away.

Figure 4B:
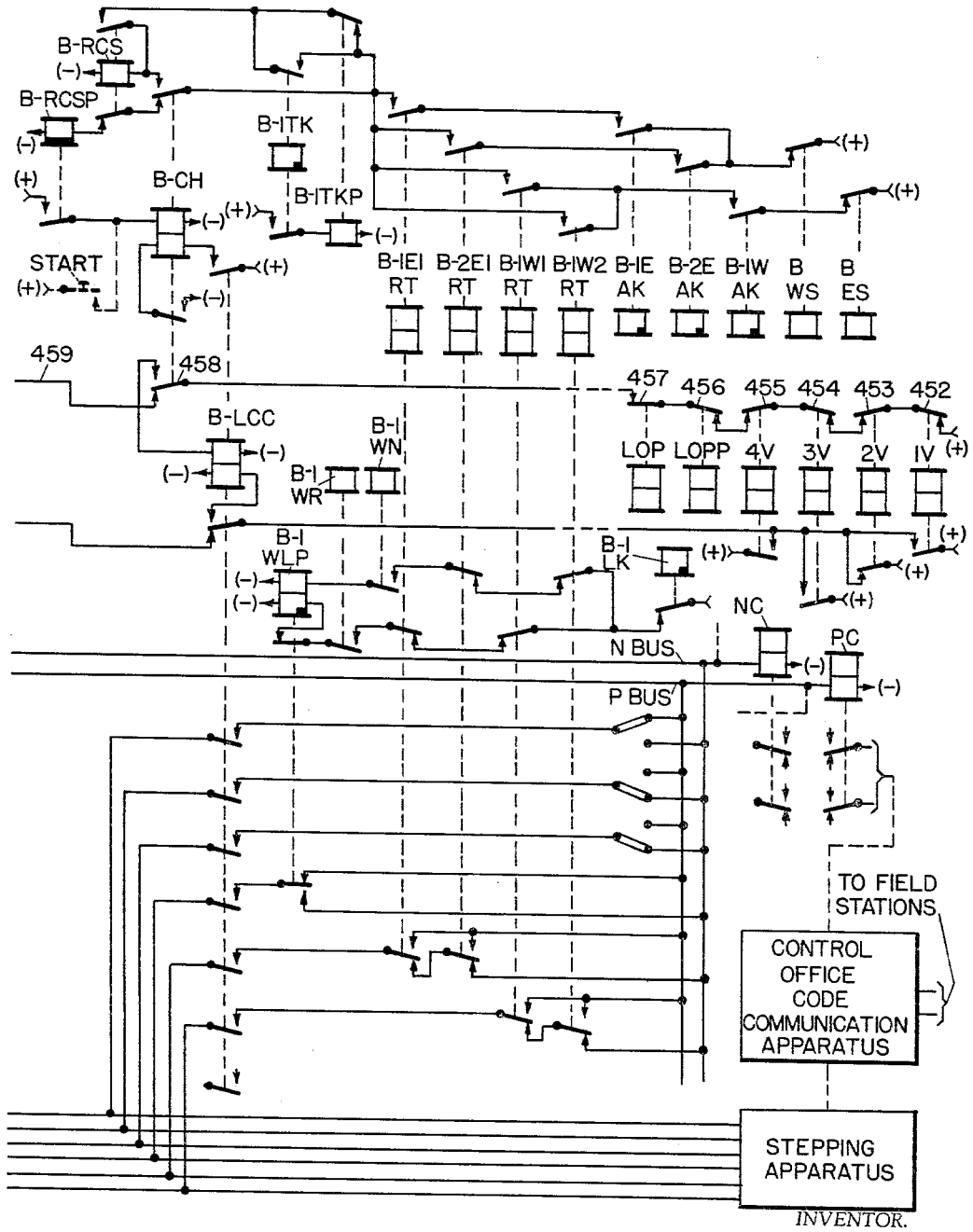

Referring to FIG. 4A, when the relay A–1E2RT is picked up, the route check stick repeater relay A–RCSP is energized, if no control is being transmitted, by a circuit which extends from (+) and includes back contact 437 of the relay A–WS, front contact 438 of the relay A–1EAK, front contact 439 of the relay A–1E2RT, back contact 440 of the relay A–CH, back contact 441 of the relay A–RCS, and the winding of the relay A–RCSP to (—). As previously described the relay A–1WR was energized upon the picking up of the relay A–1E2RT which closes the energizing circuit for knocking down the switch repeater relay A–1WLP to close its back contacts if it is not already dropped away. The circuit for knocking down this relay A–1WLP extends from (+) and includes back contact 446 of relay A–1LK, back contact 442 of the relay A–1W1RT, back contact 443 of the relay A–1E1RT, front contact 444 of the relay A–1WR, front contact 445 of the relay A–1WLP and the lower winding of the relay A–1WLP to (—). With the relay A–1WLP dropped away its back contact 447 closes thus conditioning the system to send a control over bus 448 to operate the switch to its reverse position. Also, when the relay A–1E2RT picked up its front contact 449 closed to complete a circuit over bus 450 to provide the proper code for clearing the signal A–1E.

When the relay A–RCSP is picked up, the change and storage relay A–CH is energized by a circuit which extends from (+) and includes front contact 451 of the relay A–RCSP and the upper winding of relay A–CH to (—). The relay A–CH will store a code while another code is being transmitted to another field station or location.

When there is no code being transmitted by any of the other group locations such as B for example, the relay B–CH is in its dropped away position (FIG. 4B) thus permitting the relay A–LCC to be picked up by a circuit which extends from (+) and includes back contact 452 of the relay 1V, back contact 453 of relay 2V, back contact 454 of relay 3V, back contact 455 of relay 4V, back contact 456 of relay LOPP, front contact 457 of relay LOP, back contact 458 of relay B–CH, wire 459, front contact 460 of the relay A–CH (FIG. 4A), and the upper winding of relay A–LCC to (—). The picking up of the relay A–LCC causes its front contacts, denoted at 461 (FIG. 4A) to close, thus initiating the transmission of a code. When the relay A–LCC picks up to control the code it completes a knock down circuit for the relay A–CH through its front contact 462, which is effective to drop away the relay A–CH if the relay A–RCSP is dropped away. However, it is to be noted that the relay A–RCS is held up until the track section A–1T is vacated as indicated by the picked up position of the track indication relay A–1TK. The relay A–1TKP holds the relay A–RCS energized until the relay A–1TK picks up, which in turn holds the relay A–RCS until track section A–1T is vacated. This prevents the relay A–RCSP from picking up the relay A–CH to send another code to the group A location until the train leaves track section A–1T.

The arrangement of the stepping relays in the code communication apparatus may be of any well-known type, such as disclosed in U.S. Patent No. 2,953,772, to which reference is made for a more complete description thereof.

When the read-out relay RO (FIG. 5F) picked up to initiate the reading out of a stored route from the matrix M, as previously described, it also initiated the restoring of the route in the matrix that it read out. This restoring or read back operation occurred in the following manner. the front contact 480 in the energizing circuit of the slow drop-away read-back relay RB opened, thus causing the relay RB to be deenergized and after a sufficient length of time as governed by its slow drop-away characteristics for the route to be read out of the matrix, it dropped away. The dropping away of the relay RB caused its back contacts 481 and 346 to close which applied +½ I energy over the wires 226 and 257 respectively. This application of +½ I energy over the wire 226 applied this quantity of current to all of the cores in the row R–1 of the matrix M. Simultaneously the +½ I energy over the wire 257 energized the cores in certain of the columns CN1 through CN8, namely columns CN1, CN2, CN3, CN4, CN5 and CN7. The simultaneous application of energy supplied a +I current to the cores 235, 236, 237, 238, 239 and 240, which changed the cores from their zero back to their one state thus again storing the route which was read out of the matrix when train No. 12 caused the RO relay to be energized. The coincident application of the two sources of +½ I current caused the core 235 to change its state through the front contact 500 of the relay 1LRO; core 236 through the front contact 501 of relay 2LRO; front contact 502 of the relay 1NRO for the core 237, front contact 503 of the relay 2NRO for the core 238; front contact 504 of the relay 1XRO for the core 239 and front contact 505 of the relay ERO for the core 240.

Figure 5H:
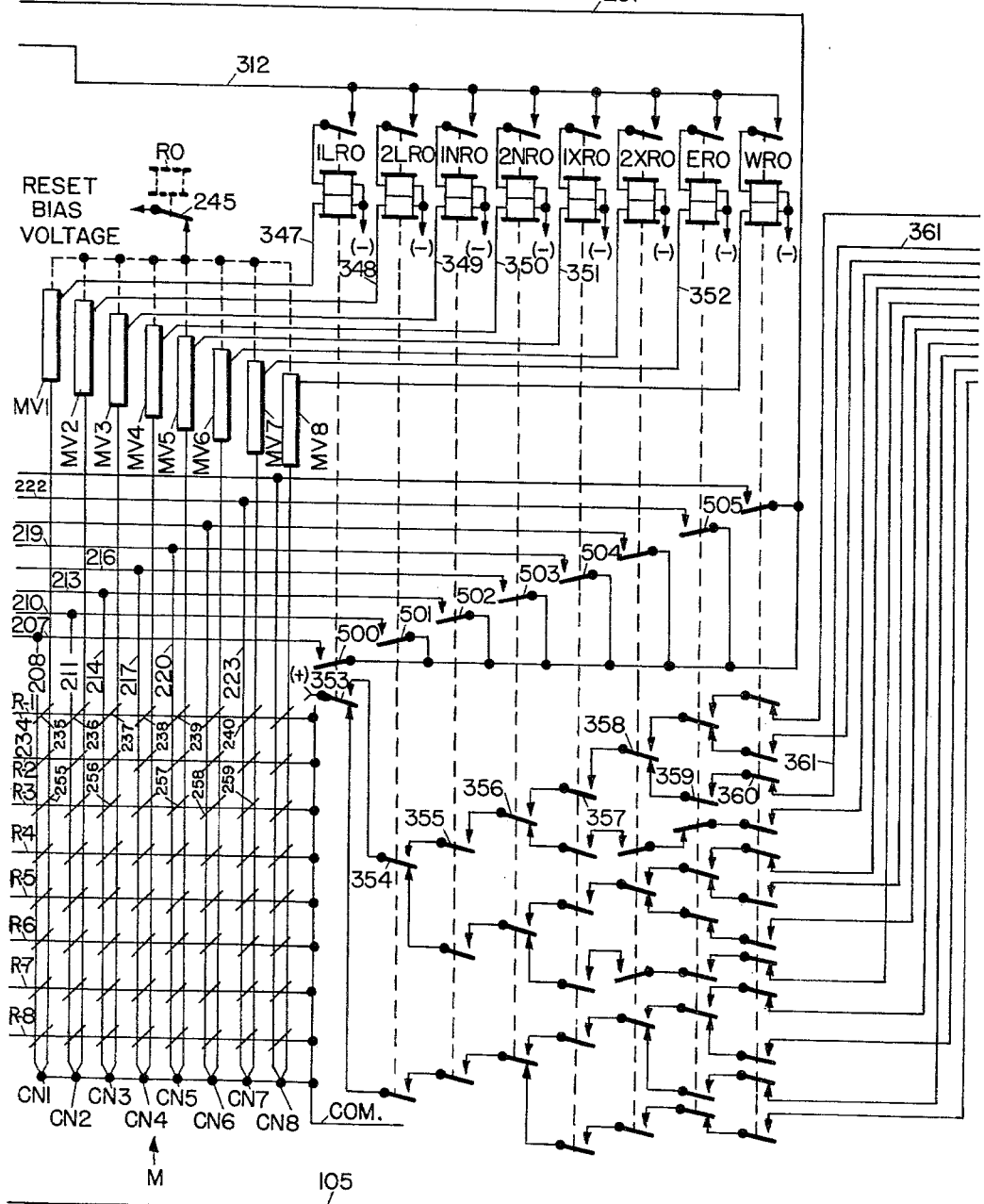
Figure 5K:
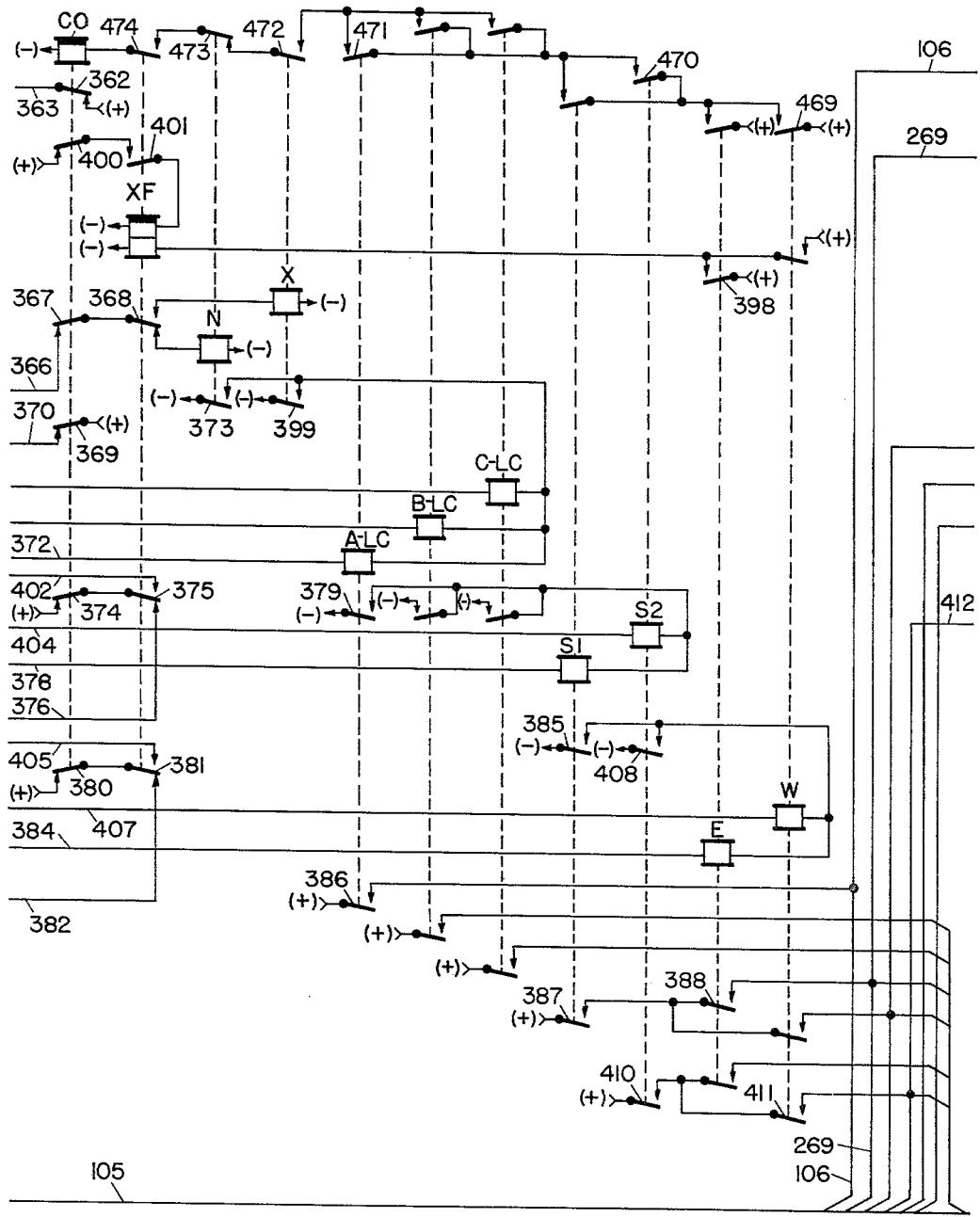
Figure 5L:
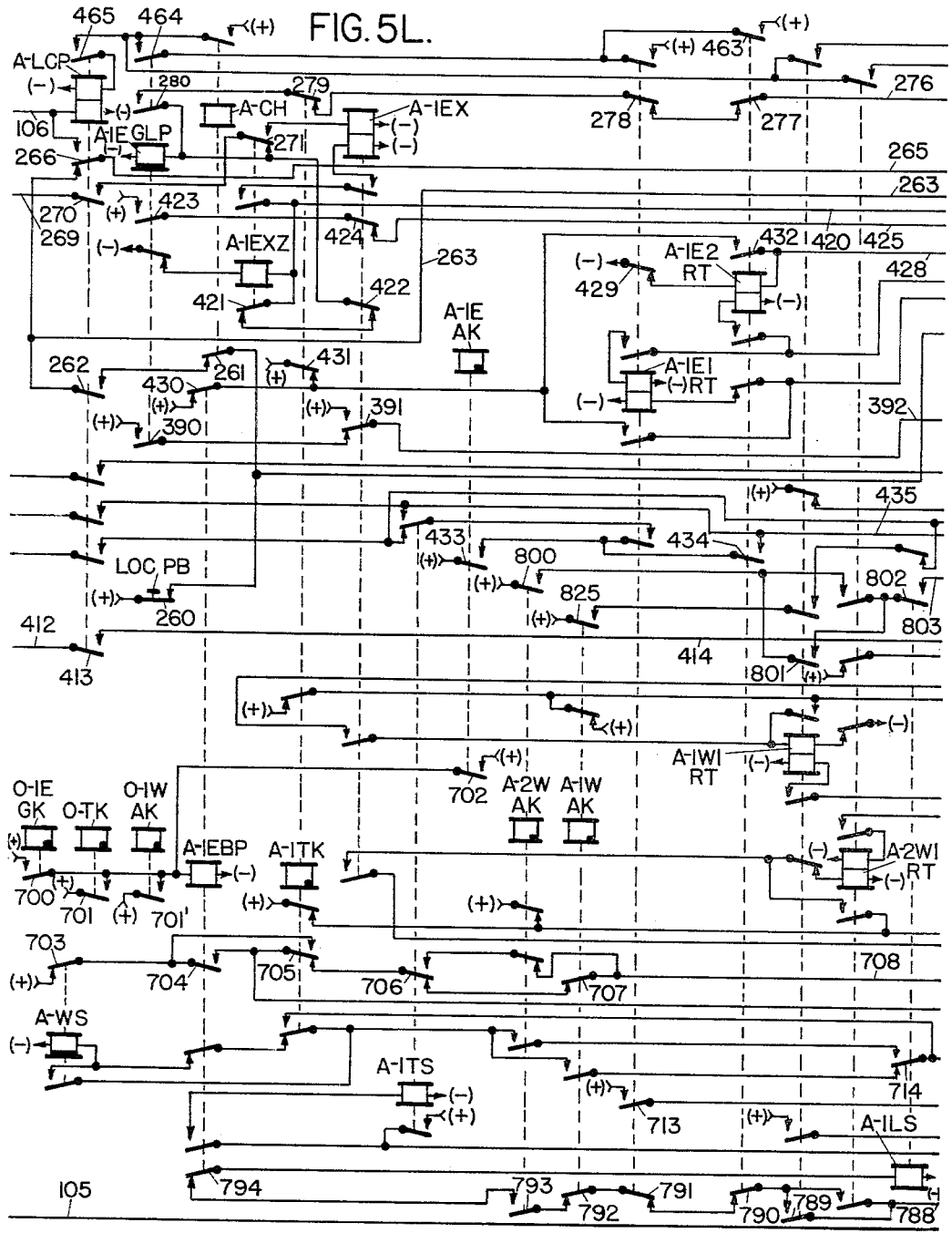
Figure 5M:
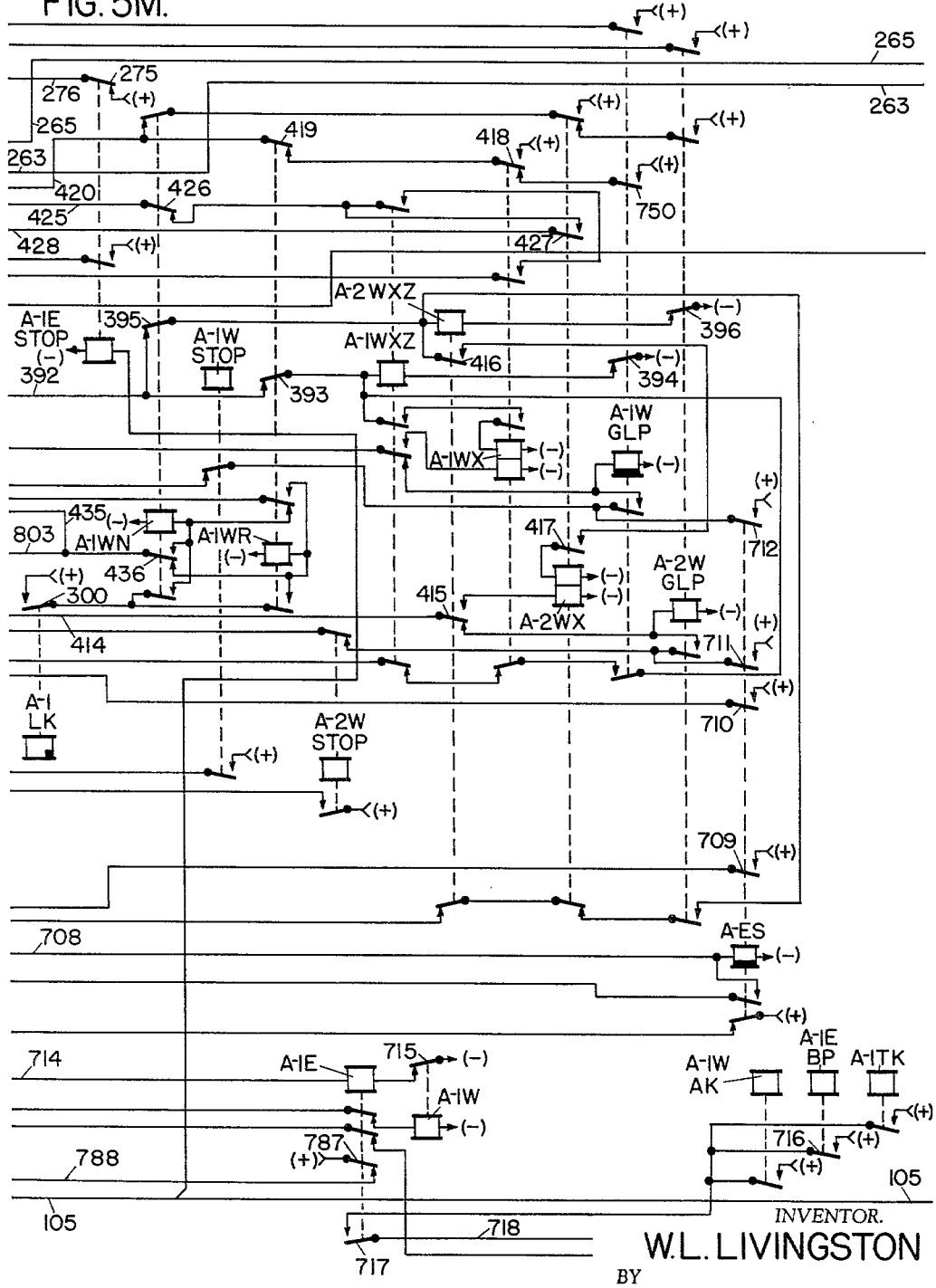

Once the read-back relay RB drops away to cause the route to be again stored in the matrix M as previously described, the relay RO is deenergized when the 12A1TL drops away as hereinafter described. This restores the slow drop-away relay RB to its normally energized position; and also removes stick energy from the relays TDR, L, N, X, C, and the RO relays. The dropping away of the relay RO resets the multivibrators MV by the closing of back contact 245 (FIG. 5H).

The system is initiated into a condition normally for automatically reading out another route upon the picking up of the clearout relay CO, or in other words when it is assumed that the previously read-out route has been transferred to pick up one of the route storage relays RT, such as the relay A–1E2RT in the described example. The circuit for picking up this relay CO (FIG. 5K) in the described example extends from (+) and includes front contact 469 of the relay E or W front contact 470 of the relay S1 or S2, front contact 471 of the relay A–LC, B–LC or C–LC, front contact 472 of the relay X, back contact 473 of the relay N, front contact 474 of the relay XF, and the winding of relay CO to (−).

The picking up of the relay CO removes stick energy from the relay A–1E2RD by the opening of its back contact 362. It also removes stick energy from the relay XF by opening its back contact 400. It removes energy from the relay X by opening its back contact 367; and removes energy from the relay A–LC by opening its back contact 369. Moreover it opens the energizing circuit for the relay S1 or S2 and E or W by opening its back contacts 374 and 380 respectively. The relay CO drops away upon the dropping away of the relay XF thus restoring the system to normal. The train following relays TL are of the slow release type and are held energized by the proper RD relays to help insure that one route is read out before another read-out is initiated.

The relay RO is dropped away when the train following relay 12A1TL is deenergized by the picking up of the route determining relay A–1E2RD. When the relay A–1E2RD picked up it opened the previously described stick circuit for the relay 12A1TL at back contact 318 of the relay A–1E2RD (FIG. 5C). At the same time the relay A–1E2RD knocks down the relay 12TIK by means of the knock down circuit shown, which in turn opens the pick up circuit of the 12A1TL relay at front contact 330. Consequently, front contact 332 of the relay 12A1TL opens thus permitting the read-out relay RO to be dropped away. When the relay A–1E2RT is picked up, it closes a knock down circuit for the relay A–LCP which extends from (+) and includes front contact 463 of the relay A–1E2RT (FIG. 5L), front contact 464 of the relay A–1EGLP, front contact 465 of the relay A–LCP, and the upper winding of the relay A–LCP to (−). It also opens the stick circuit for the relay A–1EGLP at the back contact 277 of the relay A–1E2RT thus causing relay A–1EGLP to drop away.

Upon the dropping away of the relay A–1EGLP, its front contact 390 opens in the energizing circuit for the relay A–2WXZ (FIG. 5M) and it drops away. Relay A–2WXZ opens its front contact 416 in the stick circuit of the relay A–2WX which drops away. The relay A–1E2RT (FIG. 5L) is dropped away when the train No. 12 enters the track section A–1T as indicated by the back contacts 430 of relay A–1EPB and 431 of relay A–1TK in the previously described stick circuit for relay A–1E2RT.

The switch control relay A–1WR drops away upon the opening of front contact 434 of the relay A–1E2RT unless the route is locked which is indicated by the closed front contact 309 of the relay A–1LK (FIG. 5M) in the stick circuit for the relay A–1WR.

When the relay 12A1TL (FIG. 5C) is picked up by the arrival of train No. 12 on the track section A–1EA, and when the relay A–1E2RD is picked up upon the reading out of the matrix, the train following repeater relay 12A1TLP is energized by a circuit which extends from (+) and includes front contact 510 of the relay 12A1TL, front contact 511 of the relay A–1E2RD, and the winding of relay 12A1TLP to (−). The relay 12A1TLP is held picked up by a stick circuit which extends from (+) and includes back contact 512 of the relay 12B2TLP (FIG. 5D), back contact 513 of the relay 12B1TLP, front contact 514 and the winding of the relay 12A1TLP (FIG. 5C), to (−).

When the train occupies track section A–2WA and also track section A–1T with the switch A–1SW in its reverse position and the read-out of the route completed as indicated by the picked up position of the train following repeater relay 12A1TLP, the relay 12B2TL is energized to initiate the read-out of the next portion of the route by a circuit which extends from (+) and includes back contact 326 (FIG. 5F) of the relay RI, front contact 327 of the relay RB, back contact 328 of the relay RO, wire 329, front contact 515 of the relay A–1TK (FIG. 5C), front contact 516 of the relay 12A1TLP, front contact 517 of the relay A–1WRK, front contact 518 of the relay A–2WAK, and the winding of the relay 12B2TL to (−). The relay 12B2TL is held held picked up by a stick circuit which extends from (+) and includes back contact 520 of the relay B–2E1RD (FIG. 5D), wire 521, front contact 522 of the relay 12B2TL (FIG. 5C) and the winding of the relay to (−), until the next portion of the route is read out of the matrix M. Upon the picking up of the relay 12B2TL its front contacts close to commence the reading out of that portion of the route in the group B location that is stored in the matrix M. In the embodiment shown its front contact 334 closes to energize the relay RO; its front contact 68 closes to energize the relay 1TDR; its front contact 526 closes to energize the relay 3TDR; its front contact 527 closes to energize the relay 4TDR, and its front contact 114 closes to energize the relay 1L. With the relay 12B2TL picked up, when the route is read out of the matrix, which is indicated by the picked up position of the relay B–2E1RD, the relay 12B2TLP is energized by a circuit which extends from (+) and includes front contact 523 of the relay 12B2TL, wire 524, front contact 525 of the relay B–2E1RD (FIG. 5D), and the winding of relay 12B2TLP to (−). The picking up of the relay B–2E1RD opens its back contact 520 which opens the stick circuit of the 12B2TL relay permitting it to drop away. The picking up of the relay 12B2TLP opens its back contact 512 which opens the stick circuit of the relay 12A1TLP relay permitting it to drop away.

The signal B–2E and the switch B–1SW are operated to clear the train through the B location in a manner similar to that described for the clearing of the train through the group A location.

With the switch B–1SW operated to its reverse position; when the train is occupying both track sections B–1T and B–1WA the relay 12C1TL will be energized to cause the reading out of that portion of the route that is stored for the C location for train No. 12. Thus, the movement of the train No. 12 through each group location causes a stored route for train No. 12 of the subsequent group location to be read out of the system.

In the event that an operator wishes to set up a route through the track layout manually by the operation of the various buttons on the control panel, he pulls the button A–MPB to operate the magnetic stick relay A–M to close its back contacts to condition the system for such operation.

Assuming that he wishes to set up a route for an eastbound train approaching the track layout on the main track 50 on to the passing siding 51 in the group A location, he operates the push button A–PB to designate that the route to be set up is for the switches and signals in the group A location. He then operates the buttons 1EPB on the panel section PS1 to designate that the entrance point for this route is a No. 1 eastbound signal. He then operates the push button 2WPB on the panel section PS2 to designate that the exit point for this portion of the route in the group A location is the opposing signal A–2W.

Upon the operation of the push button A–PB, the relay A–LCP is energized, and held energized by its previous described stick circuit. Upon the operation of the push button 1EPB, the relay 1EG is energized by an obvious circuit from 1EPB contact 138 (FIG. 5A) to the winding of the 1EG relay to (−). When the relay 1EG picks up the relay A–1EGLP is energized by a circuit which extends from (+) and incldes front contact 174 of the relay 1EG (FIG. 5A), wire 269, a back contact on the relay A–M, the bus 105, wire 269 (FIG. 5K), front contact 270 of the relay A–LCP (FIG. 5L), back contact 271 of the relay A–1EXZ, and the winding of the relay A–1EGLP to (−). The relay A–1EGLP is held picked up by a stick circuit which extends from (+) and includes back contact 275 of the stop relay A–1ESTOP (FIG. 5M), wire 276, back contact 277 of the route selection relay A–1E2RT, back contact 278 of the relay A–1E1RT, back contact 279 of the track indication relay A–1TK, front contact 280 and the winding of the relay A–1EGLP to (−). It will be understood from this stick circuit that the relay A–1EGLP to initiate the selection of a route, the entrance point of which is the signal A–1E will not be held up to permit the completion of a route involving this signal if a similar route has already been selected either by the automatic read-out of this system or otherwise, or if a train is occupying the track section A–1T.

The picking up of the relay A–1EGLP conditions the system for the subsequent designation of the exit point of this portion of the route at either of the opposing westbound signals A–1W or A–2W by picking up the relays A–1WXZ and A–2WXZ by pick-up circuits previously described in connection with the automatic operation of the system.

Upon the subsequent operation of the push button 2WPB on the panel section PS2, the relay 2WG is picked up by a circuit which extends from (+) and includes contact 139 of the push button 2WPB and the winding of the relay 2WG to (−). When the relay 2WG picks up the relay A–2WX is picked up by a circuit extending from (+) and including a front contact 184 (FIG. 5B) of the relay 2WG, a back contact of the relay A–M, bus 105, wire 412 (FIG. 5K), front contact 413 of the relay A–LCP (FIG. 5L), wire 414, front contact 415 of the relay A–2WXZ (FIG. 5M) and the lower winding of the relay A–2WX to (−). Upon the picking up of the relay A–2WX with the relay A–1EGLP picked up, the route selection relay A–1E2RT is energized by a circuit described in connection with the automatic operation of the system. The picking up of the relay A–1E2RT causes the relay A–1EGLP to drop away, causes the relay A–LCP to be knocked down, picks up the switch control relay A–1WR, and causes the transmission of the proper code for operating the switches and signals in the group A location in the same manner as described for the automatic operation of the system.

In the event that an operator desires to merely change the position of a switch in the territory controlled by this system he operates either the button NB or RB on the panel section PS1 or PS2, as the case may be, which directly picks up the proper switch control relay over the bus 105, and then he operates the start button on either the panel section 1 or 2 to directly pick up the CH relay associated with the group location in which the switch is located to transmit a control to the field station.

Each time a train approaches a group location, if there is no conflicting opposing traffic, a directional stick relay for a respective group is picked up upon the picking up of a block repeater relay, such as A–1EBP. In this example, upon the picking up of the relay A–1EBP, the directional stick relay A–ES is energized by a circuit which extends from (+) and includes back contact 703 of the directional stick relay A–WS, front contact 704 of the relay A–1EBP, back contact 705 of the track indication relay A–1TK, back contact 706 of the relay A–1TS, back contact 707 of the relay A–1WAK, wire 708, and the winding of the relay A–ES to (−). The picking up of the relay A–ES provides an additional stick circuit for the route storage relay A–2W1RT through its front contact 709; for the route storage relay A–1W1RT through its front contact 710; for the signal clearing entrance relay A–2WGLP through its front contact 711, and for the entrance signal clearing relay A–1WGLP through its front contact 712.

It is recalled that the route is selected for transmission to the field station by the picking up of the relay A–1E2RT, and this relay is held picked up by the relay A–1EPB until the eastbound train No. 12 leaves the approach section A–1EA. The directional stick relay A–ES is held up until the train leaves the next track section A–1T.

If, a westbound train, arrives on the track section B–1EA, when the route storage relay A–1E2RT is picked up and a route is transferred to the group A location for permitting the westbound train to travel from the signal A–1W on the main track 50, the relay A–1WGLP is energized upon the picking up of the W relay (FIG. 5K) in the same manner as was previously described in connection with the picking up of the relay A–1EGLP.

The relay A–1WGLP then causes the exit auxiliary relay A–1EXZ to be energized by the application of energy through front contact 750 (FIG. 5M) of the relay A–1WGLP. In the manner previously described in connection with the establishing of an exit point for the train No. 12, the relay A–1EX is picked up thus indicating that the exit point for the route for the westbound train is the signal A–1E. Under ordinary circumstances the relay A–1W1RT is picked up upon the picking up of the relay A–1EX when the relay A–1WGLP is picked up. However, it is to be noted, that in FIG. 5M the back contact 393 of the relay A–1WR is included in the pick up circuit for the relay A–1W1RT. Therefore, the directional stick relay serves to hold the relays A–1WGLP energized to hold the route until the back contact 393 of the relay A–1WR closes so that the route storage relay A–1W1RT can be picked up. Thus, the directional stick relay for a train going in one direction serves to hold the entrance and exit designations until conditions are such to establish the route storage relay for a train going in the opposite direction.

When the relay A–1W1RT picks up, the relay A–ES holds this route storage relay energized through its front contact 709.

Moreover, it is to be noted in FIG. 4A that back contact 753 of the relay A–ES is included in the energizing circuit for the relay A–RCS to initiate the transmission of a code. Therefore, a code will not be transmitted for the westbound train until the eastbound train in the group A location leaves the track section A–1T. Then, the back contact 753 of the relay A–ES will close to cause the relay A–RCS to pick up and initiate the proper transmission of a code as previously described. When the train leaves the track section A–1T, front contact 705 of the relay A–1TK opens thus dropping away the relay A–ES.

Assuming that a route is stored for an eastbound train which extends throughout the territory in the group A, B and C locations on the main track 50, and a route is also stored for a westbound train extending through the groups A, B and C location on the main track 50, it is apparent that if these two trains enter the territory at approximately the same time from opposite directions that their routes would conflict at some point on the main track depending upon the speed of the opposing trains. This condition may occur when either one or the other of the trains is off schedule. According to this invention, one of the trains will be automatically routed onto a siding to prevent a tie-up of traffic or a collision and off the siding behind the other train travelling in the opposite direction on the main track.

When the eastbound train is in the location preceding the group A location, or has received a proceed signal to occupy this preceding location which in this embodiment is referred to as location O (FIG. 2), the indication relay O–1EGK is energized indicating that the eastbound signal in the O location is cleared. Upon the picking up of the relay O–1EGK, the relay A–1EBP (FIG. 5L) is energized by a circuit which extends from (+) and includes front contact 700 of the relay O–1EGK and the winding of the relay A–1EBP to (−). This relay is held up until the eastbound train leaves the track section A–1EA. This is apparent in FIG. 5L by the inclusion of front contact 701 of the relay O–TK, front contact 701′ of the relay O–1WAK, and front contact 702 of the relay A–1EAK in the energizing circuit of the relay A–1EBP.

In this example, when the eastbound train reached the track section A–1EA and passed the inductor ED, the system would read out a route through the group A location which would cause the picking up of the relay A–1E1RT in the manner previously described. Upon the picking up of the relay A–1E1RT, the relay A–1E (FIG. 5M) is energized by a circuit which extends from (+) and includes front contact 713 of relay A–1E1RT (FIG. 5L), wire 714, the winding of relay A–1E (FIG. 5M), and back contact 715 of the relay A–1W to (−).

If no westbound signal has been cleared into, or a westbound train is occupying track No. 50 in the group C location, the system will operate in a normal manner as previously described and the relay A–1E1RT will drop away when the eastbound train is occupying both track sections A–1EA and A–1T. The dropping away of the relay A–1E1RT is caused by the opening of back contact 431 of the relay A–1TK (FIG. 5L), while back contact 430 of the relay A–1EBP is open, in the stick circuit of the relay A–1E1RT. When the eastbound train leaves the track section A–1EA, the relay A–1EBP drops away.

Figure 5N:
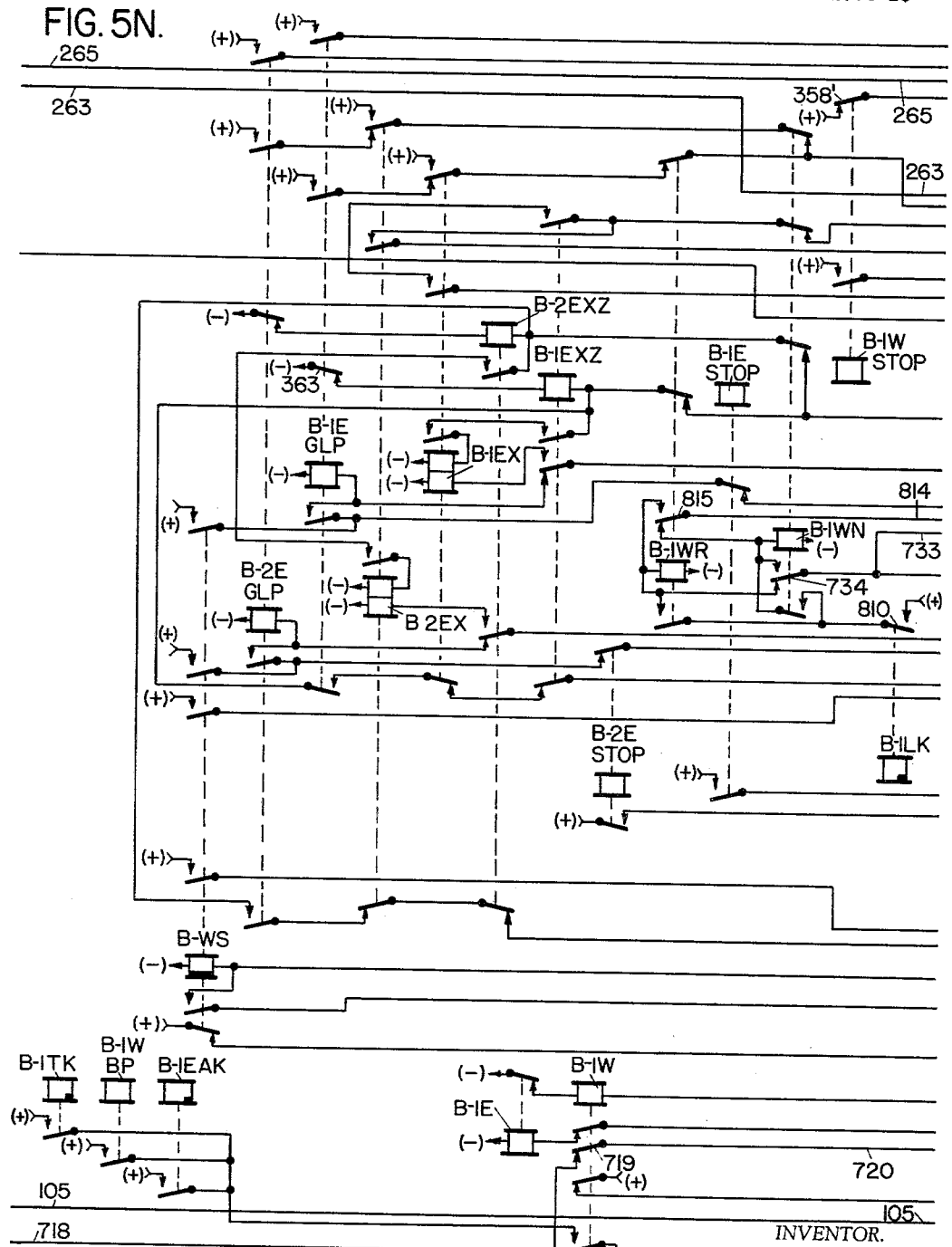

However, if a westbound signal has been cleared into, or a westbound train has accepted a proceed signal in the group C location on track No. 50 before the eastbound train has left the track section A–1EA, the relay B–1TS (FIG. 5P), is energized by a circuit which extends from (+) (FIG. 5M) and includes front contact 716 of the relay A–1EBP, front contact 717 of the relay A–1E, wire 718, back contact 719 of the relay B–1W (FIG. 5N) which indicates that a westbound train has not read out a route in the B location on track No. 50, wire 720, front contact 721 of the relay B–1WBP (FIG. 5P), and the winding of the relay B–1TS to (−). It is evident from the circuitry in FIG. 5P that the relay B–1WBP is energized to close its front contact 721 when a train receives a proceed westbound signal in the group C location as indicated by the closing of front contact 722 of the relay C–1WGK. It is also apparent that the relay B–1WBP is held picked up as long as the westbound train occupies the main track 50 in the group C location as indicated by front contacts 723 of the relay B–1WAK, 724 of the relay C–1TK, and 725 of the relay C–1EAK in the pick-up circuit of the relay B–1WBP. Once the take siding relay B–1TS has been picked up because a train has not left the track section A–1T and a westbound train has received a proceed signal in the group C location, the relay B–1TS will remain picked up until the westbound train enters the siding at the group B location.

When the westbound train reaches the track section C–1EA, and remembering the route that is stored for this train is over the track No. 50, the relay B–1W1RT will be picked up in the manner previously described. However, because the take siding relay B–1TS is picked up, the picking up of the relay B–1W1RT will not cause the switch B–1SW to be operated to its normal position as previously described, but the relay B–1W1RT will cause the switch to be controlled to its reverse position so that the westbound train will automatically be routed on to the siding 51.

Figure 5P:
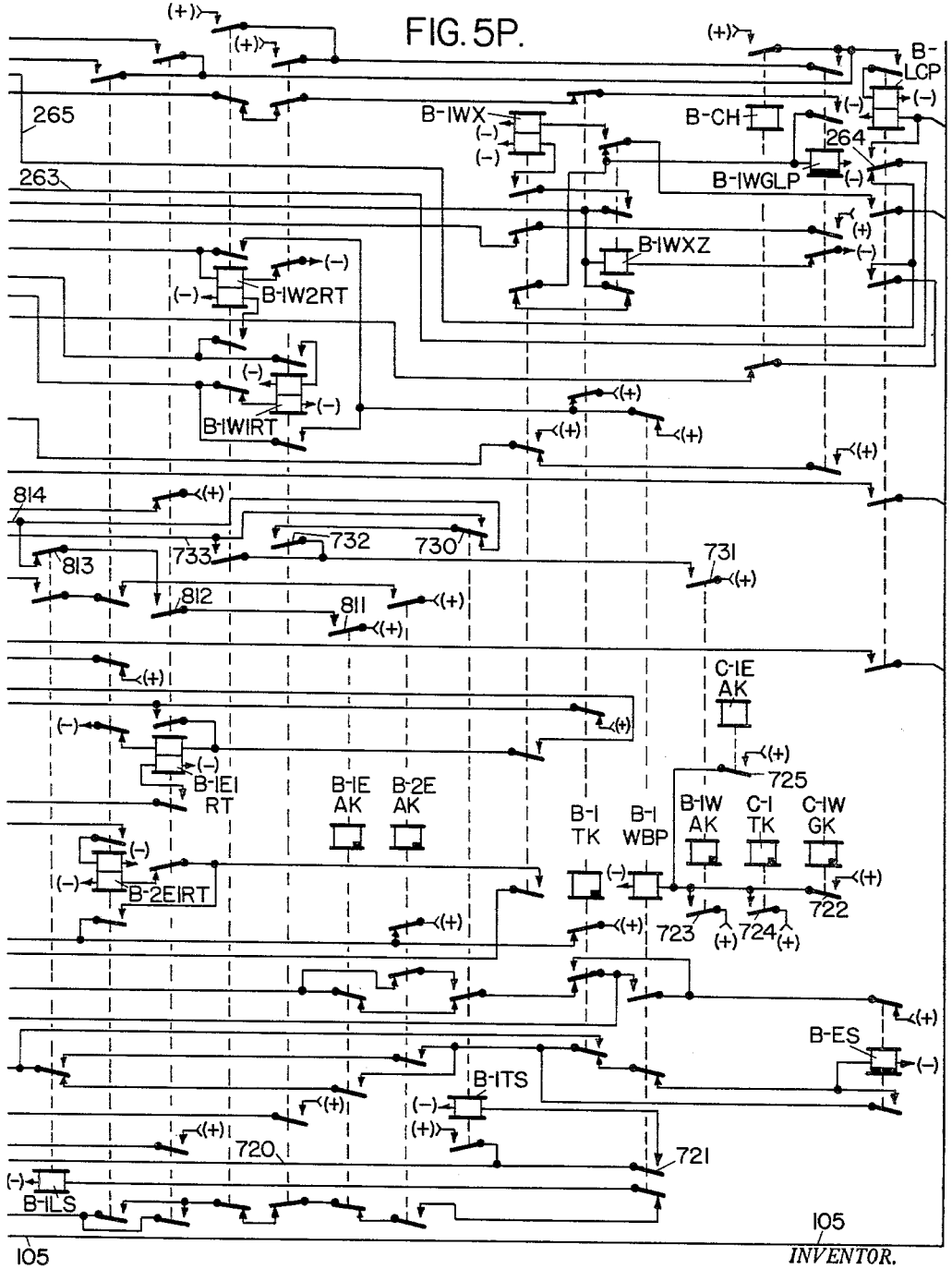

In FIG. 5P, it is shown that when relay B–1TS picks up, its front contact 730 closes, thus causing the relay B–1W1RT to energize the relay B–1WR by a circuit which extends from (+) and includes front contact 731 of the relay B–1WAK, front contact 732 of the relay B–1W1RT, front contact 730 of the relay B–1TS, wire 733, back contact 734 of the relay B–1WN and the winding of the relay B–1WR to (−). Thus, even though the route for the westbound train No. 21 that is stored in the system calls for the train to travel through the group B location on the main track 50, the fact that the east bound train at first caused the relay A–1EBP to pick up before the westbound train reached the group C location, the westbound train is routed onto the siding 51 so to prevent the halting traffic.

It is apparent that if the route for the westbound train B–1W1RT is the first route to be read out of the system as indicated by the picked up position of the relay B–1W1RT the relay B–1W would be energized by an obvious circuit, thus causing the relay A–1TS to be picked up which would cause the eastbound train to take the siding 51 in the group A location instead of the westbound train taking the siding 51 in the group B location.

At this point in the described example, train No. 21 is moving westerly in the group B location on to the siding 51 and train No. 12 is moving easterly in the group A location on the main track 50. When the front of the eastbound train No. 12 reaches track section A–1WA its train following relay 12B1TL will pick up to cause the route stored for the train in the B location to be read-out of the matrix M and the relay B–1E1RT will pick up. When the westbound train No. 21 leaves track section B–1WA, the relay B–1TS will drop away by opening its stick circuit at front contact 721 of relay B–1WBP. Then the relay B–1E1RT can operate the switch B–1SW to normal position for the train No. 12 after the train No. 21 advances out of the B location to cause the reverse switch control relay B–1WR to drop away by the opening of front contact 810 of relay B–1LK. The circuit for picking up the relay B–1WN extends from (+) and includes front contact 811 of relay B–1EAK, front contact 812 of the relay B–1E1RT, back contact 813 of the relay B–1LS, wire 814, back contact 815 of relay B–1WR (FIG. 5N), and the winding of relay B–1WN to (—). Train No. 12 is now occupying track section B–1EA, and since train No. 21, which is in the clear on the siding 51 and advancing into section A–2WA, has its train following repeater relay 21B1TLP energized, the occupancy of track section B–1EA and B–1T by train No. 12, with the switch B–1SW in its normal position, the train following relay 21A1TL is energized by a circuit which extends from (+) and includes back contact 326 (FIG. 5F) of relay R1, front contact 327 of relay RB, back contact 328 of relay RO, wire 329, front contact 820 of relay 21B1TLP (FIG. 5E), wire 821, front contacts 822 and 822' (FIG. 5D) of relay B–1TK and B–1NWK, respectively, front contact 823 of relay B–1EAK, and the winding of relay 21A1TL to (—). This, of course, is a train following relay which initiates the reading out of the route which is stored for the train No. 21 and in a manner previously described causes the picking up of the relay A–1W1RT. This relay ordinarily controls the switch A–1SW to a normal position. However, since track section A–1WA is unoccupied, front contact 825 (FIG. 5L) of relay A–1WAK is open in the pick up circuit for the A–1WN switch control relay, the switch cannot be controlled to normal. Instead, if there is no conflicting eastbound traffic in group location O or A, the relay A–1LS is energized by a circuit which extends from (+) and includes back contact 787 of relay A–1E (FIG. 5M), wire 788, front contact 789 of relay A–1W1RT (FIG. 5L), back contact 790 of relay A–1E2RT, back contact 791 of relay A–1E1RT, back contact 792 of relay A–1WAK, front contact 793 of relay A–2WAK, back contact 794 of relay A–1EBP, and the winding of relay A–1LS to (—). The picking up of the relay A–1LS with the route selection relay A–1W1RT energized, energizes the reverse switch control relay A–1WR by a circuit which extends from (+) and includes front contact 800 (FIG. 5L) of relay A–2WAK, front contact 801 of relay A–1W1RT, front contact 802 of relay A–1LS, wire 803, back contact 436 of relay A–1WN and the winding of relay A–1WR to (—). Thus, train No. 21 is automatically routed off the passing siding 51 in the group A location behind the train No. 12 and a successful meet has been accomplished automatically.

If it is desired to cancel any portion of a stored route for a particular identified train, such as the stored route for train No. 12 in the group A location, for example, the operator presses the button A–MPB to close the front contacts and open the back contacts of the relay A–M. He then presses the train identification push buttons 10 and 2, which energize the relays 1TDR, 3TDR and 4TDR, as hereinbefore described. The operator then presses the group location push button A–PB, thus energizing the relays 1L and 2L, and also presses the appropriate entering signal button 1EPB, thus energizing the relay 2N. Subsequently, he pulls the button RI–CC which energizes the relay CC (FIG. 5F) by a circuit which extends from (+) and includes contact 200 (FIG. 5A) of the push button R1–CCPB, wire 760, front contact 761 of the relay A–M, wire 762 and the winding of the relay CC to (—). Upon the picking up of the relay CC its front contact 763 closes to apply a —I potential through the back contact 345 of the relay RO, front contact 346 of the relay RB, back contact 225 of the relay RI, wire 226, front contact 227 of the relay 1TDR, back contact 228 of the relay 2TDR, front contact 229 of the relay 3TDR, front contact 230 of the relay 4TDR, front contacts 231 and 232 of the relays 1L and 2L respectively, front contact 233 of the relay 2N, and over wire 234 to the row R–1 of the matrix M. This application of —I current changes all of those cores in the row R–1 that are in their "one" state to the zero state. Upon the picking up of the relay CC, a relay CCP is energized (FIG. 5F) by an obvious circuit which includes front contact 764 of the relay CC, thus causing the back contact 98' to open the previously described stick circuit for the relays TDR, 1L and 2L, and 2N. This relay CCP is a slow pick up relay to insure that the —I current will be applied to the appropriate row of the matrix M before the train identification, location, and entrance relays are dropped away. When the button RI–CCPB is released, the relay CC drops away, thus removing the —I current and also deenergizing the relay CCP to close its back contact 98', thus placing the system in a condition for either another cancellation or the storing of a route.

If it is desired to cancel all of the routes which are stored in a memory matrix M the operator merely presses the buttons MC1PB and MC2PB thus closing its contacts 765 and 766 (FIG. 5G) to energize the relay MCL. As is apparent from FIG. 5G, the picking up of the relay MCL applies —I current to each row R–1 through R–8 of the matrix M. It is to be noted that in order to cancel all of the stored routes in the matrix both buttons MC1PB and MC2PB must be pressed simultaneously and they are located on the control panel P a distance apart to prevent their inadvertent operation.

In the event the operator wishes to cancel out a route that is manually or automatically set up, he drops the relay A–M by pulling the button A–MPB, then presses the proper location selection button LCPB, which picks up the proper relay LCP, and then presses the stop button which energizes the stop relays (A–1ESTOP, FIG. 5M, for example), which knocks down the route relay RT that is energized, thus cancelling the route that is set up.

Having thus described an improved centralized traffic control system for the control of typical switches and signals as one embodiment of the invention, it is desired to be understood that this embodiment has been selected in order to most advantageously disclose the features of the present invention, and that the present invention may be applied to the control of devices other than those herein illustrated, and it is further understood that various adaptations, modifications and alterations may be made to the specific form shown without departing from the spirit or scope of the present invention except as limited by the appended claims.

What I claim is:

1. In a centralized traffic control system for controlling from a control office the selected routing of trains through a territory having a plurality of diverging and converging routes for both directions of traffic, and a plurality of field stations, each field station having means for controlling selectively a plurality of traffic governing devices for a predetermined portion of a route,
   (a) code communication apparatus connecting the central office and each of the field stations for operating the devices and for transmitting indications to the central office,
   (b) manually operable means at the control office for designating a route over that portion of the track layout for each field station,
   (c) manually operable means at the control office for designating the identity of a train for a designated route,
   (d) a magnetic core route storage matrix having a plurality of cores in rows and columns, said cores being changeable from one state to another,
   (e) read-in means at the control office effective when operated to change selected ones of said cores to one state as controlled by both said manually operable means to store a distinct train identity and route portion in the storage matrix,
   (f) train identity transmitting and receiving means connecting the control office and the approach to the track layout operative to detect in the control office the approach of a distinctively identified train approaching the track layout,
   (g) a train following means in the control office for each separately identified train that is to travel through the track layout operative when activated upon the detection of a train by said train identity means to store the presence of the identified train progressively as it travels from one field station to the next, (h) first core changing means including said train following means when activated effective to change the cores in said one state to said other state in a predetermined one of said rows of the route storage matrix, (i) a normally inactive route determining means for each possible route for each field station, (j) read-out means responsive to the change of said selected cores from said one state to the other state to activate a selected one of said route determining means, (k) circuit means responsive to the activation of said one route determining means to condition the train following means for subsequently causing the cores in the one state in another of said rows to change to the other state when the train approaches the next field station, (l) a plurality of route selection means each activated upon the activation of a respective route determining means to govern said code communication system to transmit controls to operate the traffic governing devices associated with a respective field station for routing the train over the selected route, (m) and circuit means governed by the indications of the condition of the traffic governing devices transmitted to the control office operative to govern each activated route selection means to delay the transmission of controls to a respective field station while a train is approaching another field station to travel over a conflicting route.

2. A system as claimed in claim 1 having second core changing means wherein said cores that are changed to said other state in a selected one of said rows are changed back to said one state after being changed to said other state.

3. A system as claimed in claim 2 wherein said second core changing means when activated for changing the cores are inactivated upon the activation of said route determining means to permit a subsequent activation of said core changing means.

4. A system as claimed in claim 3 wherein the activation of any one of said route selection means inactivates its respective route determining means.

5. In a centralized traffic control system wherein track switches and signals for trains travelling in opposite directions over converging and diverging routes through a track layout are controlled selectively by code communication apparatus including (a) a code communication channel connecting the control office and the means for controlling the switches and signals in accordance with the selected position of manually operable devices in the control office, one of said manually operable devices being provided for each signal in the track layout, the combination of (b) a storage matrix means for storing indefinitely a plurality of train route codes contemporaneously, (c) read-in means effective to cause said matrix means to store a distinctive route code upon the operation of the manual means to a selected position for a pair of signals along the track layout, the entrance of said distinctive route being governed by the first signal of the pair selected by the manual means, (d) read-out means responsive to a train approaching one of said pair of signals to cause said storage matrix means to operate the code communication apparatus to clear the route for the train between said pair of signals, (e) and read-back means operatively connected to said read-out means effective to restore said same distinctive route code into said storage matrix as originally inserted by said read-in means.

6. A system as claimed in claim 5 wherein the read-out means also causes the operation of any switch between said pair of signals to cause the train to exit past the second signal of the pair.

7. In a centralized traffic control system for controlling from a central office the selected routing of trains in opposite directions through a territory having a plurality of diverging and converging routes for both directions of traffic, and a plurality of field stations, each field station having means for operating selectively a plurality of traffic governing devices for a predetermined portion of each route in response to a control code transmitted from the central office and addressed to a respective field station, each field station also having means for transmitting the operated condition of its traffic governing devices to the central office, comprising (a) a storage matrix including a plurality of storage devices for storing discrete bits of information, (b) means at the central office for designating the identity of each train that is to travel in the territory, (c) means for selecting each portion of the plurality of routes for each field station, (d) means governed by the identity designating means and the route selection means to store in the matrix contemporaneously a plurality of train route storages, each of which constitutes the identification of a train and a selected portion of each route for a respective field station, (e) means to transmit to the central office the identity of each train, (f) means to transmit to the central office the location of a train at the approach to each portion of the territory controlled by each field station.

(g) read out means activated in response to the identity and presence of a train at the approach to each field station to sense a distinct train route stored in the storage matrix for the identified train to travel when traversing the territory controlled by the respective field station, (h) a plurality of route selection storage means for storing contemporaneously each portion of each route through the territory governed by each field station, each storage means operative when activated to govern the transmission of a control code to operate the traffic governing devices to a distinctive condition for each portion of a route through each field station, (i) transfer means responsive to each separate activation of the read out means to store a distinct route in the route selection storage means, (j) circuit means governed by the transfer means to restore the distinctive route to the storage matrix subsequent to each activation of the read out means, and (k) circuit means at the central office governed by the operating condition of the traffic governing devices for a plurality of field stations to activate each of the route selection means one at a time to send a distinctive control code only when no train is occupying a portion of the territory conflicting with the distinctive route stored by the route selection storage means, whereby the routes stored in the matrix are read out one at a time as each respective train approaches a field station, but is not transmitted to a field station to operate the traffic governing devices until traffic conditions are safe as governed by the field station transmitting means.

8. In a system as claimed in claim 7 wherein the transfer means includes a temporary storage circuit means operative to store only one route at a time upon activation by the read out means and the restoring circuit means restores the route in the storage matrix upon the activation of said temporary storage means.

9. A system according to claim 7 wherein said storage matrix is comprised of a plurality of magnetic cores arranged in rows and columns and said restoring circuit means is operative to energize the same selected ones of the cores sensed by the read out means.

10. In a system according to claim 7 wherein the identity transmitting means includes means at the wayside at the approach to the territory governed by the first encountered field station,
  (a) said wayside means being responsive to the passage of a train to transmit the identity of the train to the central office,
  (b) means at the central office to store the identity and route information for each train through the territory,
  (c) circuit means governed by the entrance and exit of each identified train from one field station to the next to transfer the stored train identity and route means to the next field station,
  (d) and means responsive to a transfer by the last named circuit means to activate the read out means upon the completion of each such transfer.

11. A system according to claim 10 wherein the last named circuit means for transferring a train identification and route selection to a subsequent field station is governed by the distinctive condition of a track switch at the territory controlled by a previous field station in the direction of travel of the train.

References Cited by the Examiner
UNITED STATES PATENTS

| | | | |
|---|---|---|---|
| 2,197,130 | 4/1940 | Lewis | 246—5 |
| 2,580,150 | 12/1951 | Allen | 246—134 |
| 2,708,267 | 5/1955 | Weidenhammer | 340—174 |
| 2,715,178 | 8/1955 | Coughlin | 246—2 |
| 2,719,965 | 10/1955 | Person | 340—174 |
| 2,736,880 | 2/1956 | Forrester | 340—174 |
| 2,775,689 | 12/1956 | Pascoe | 246—2 |
| 2,863,992 | 12/1958 | George et al. | 246—134 |
| 2,910,578 | 10/1959 | Korlet et al. | 246—134 |
| 2,915,622 | 12/1959 | Coley | 246—134 |
| 2,916,612 | 12/1959 | Marple | 246—2 |
| 2,970,296 | 1/1961 | Horton | 340—174 |
| 2,973,508 | 2/1961 | Chadurjian | 340—174 |

EUGENE G. BOTZ, *Primary Examiner.*

JAMES S. SHANK, LEO QUACKENBUSH,
*Examiners.*